United States Patent
Harada et al.

(10) Patent No.: US 9,980,274 B2
(45) Date of Patent: May 22, 2018

(54) USER TERMINAL, RADIO BASE STATION AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Liu Liu, Beijing (CN); Jing Wang, Beijing (CN); Yu Jiang, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days. days.

(21) Appl. No.: 15/514,025

(22) PCT Filed: Sep. 25, 2015

(86) PCT No.: PCT/JP2015/077048
§ 371 (c)(1),
(2) Date: Mar. 24, 2017

(87) PCT Pub. No.: WO2016/047730
PCT Pub. Date: Mar. 31, 2016

(65) Prior Publication Data
US 2017/0280468 A1     Sep. 28, 2017

(30) Foreign Application Priority Data
Sep. 25, 2014     (JP) .................................. 2014-195458

(51) Int. Cl.
*H04W 72/00*     (2009.01)
*H04W 72/08*     (2009.01)
*H04W 24/08*     (2009.01)
*H04L 5/00*      (2006.01)
(Continued)

(52) U.S. Cl.
CPC ......... *H04W 72/085* (2013.01); *H04L 5/0048* (2013.01); *H04L 5/0057* (2013.01);
(Continued)

(58) Field of Classification Search
CPC .............................. H04W 48/16; H04W 24/10
(Continued)

(56) References Cited

U.S. PATENT DOCUMENTS

2011/0263252 A1* 10/2011 Saini ..................... H04W 48/16
455/434
2012/0113843 A1* 5/2012 Watfa ................ H04W 72/1289
370/252

(Continued)

OTHER PUBLICATIONS

International Search Report issued in corresponding application No. PCT/JP2015/077048 dated Nov. 24, 2015 (4 pages).
Written Opinion of the International Searching Authority issued in corresponding application No. PCT/JP2015/077048 dated Nov. 24, 2015 (3 pages).

(Continued)

*Primary Examiner* — Kiet Doan
(74) *Attorney, Agent, or Firm* — Osha Liang LLP

(57) ABSTRACT

In order to minimize reduction of the usage efficiency of radio resources even when a radio base station performs LBT in an LTE/LTE-A operating system, the present invention provides a user terminal capable of communicating with a radio base station of a given operator using an unlicensed band. The user terminal has: an obtaining section that obtains a PLMN-ID (Public Land Mobile Network Identifier) of a cell that is detected in a cell search; a detecting section that detects the cell of an other operator cell that is different from the given operator based on the PLMN-ID; and a transmission section that transmits an identifier to specify the cell of the other operator and the PLMN-ID of the other operator to the radio base station.

9 Claims, 16 Drawing Sheets

(51) Int. Cl.
  *H04W 84/04* (2009.01)
  *H04W 88/08* (2009.01)
  *H04W 88/02* (2009.01)
(52) U.S. Cl.
  CPC .......... *H04W 24/08* (2013.01); *H04W 84/042* (2013.01); *H04W 88/02* (2013.01); *H04W 88/08* (2013.01)
(58) Field of Classification Search
  USPC .... 455/434, 515, 436, 444, 452.1, 423, 502, 455/450; 370/330, 252, 329, 350
  See application file for complete search history.

(56) References Cited

U.S. PATENT DOCUMENTS

| | | | | |
|---|---|---|---|---|
| 2013/0301451 | A1* | 11/2013 | Siomina | H04W 24/00 370/252 |
| 2015/0092768 | A1* | 4/2015 | Ng | H04W 48/16 370/350 |
| 2015/0215855 | A1* | 7/2015 | Yie | H04W 48/16 370/329 |

OTHER PUBLICATIONS

3GPP TS 36.300 V8.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).

* cited by examiner

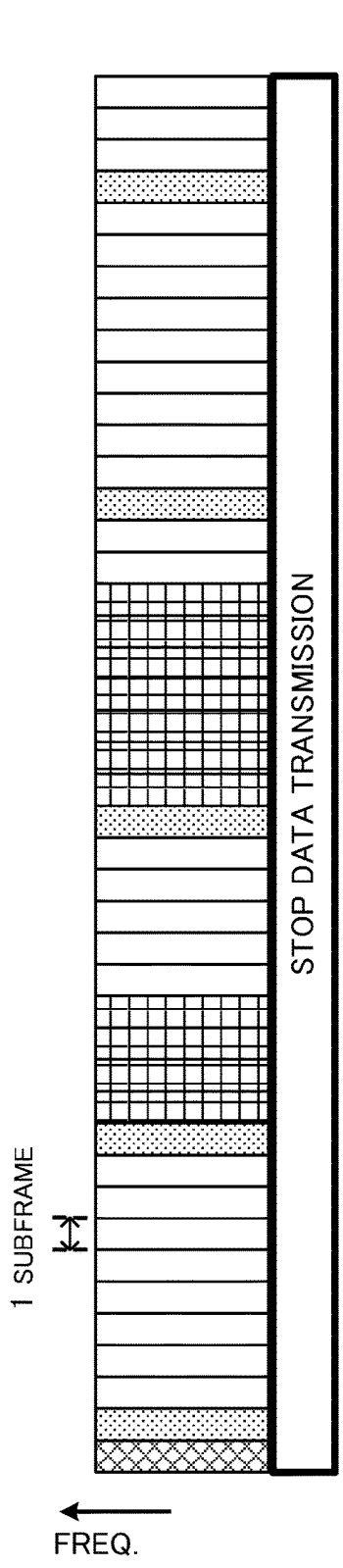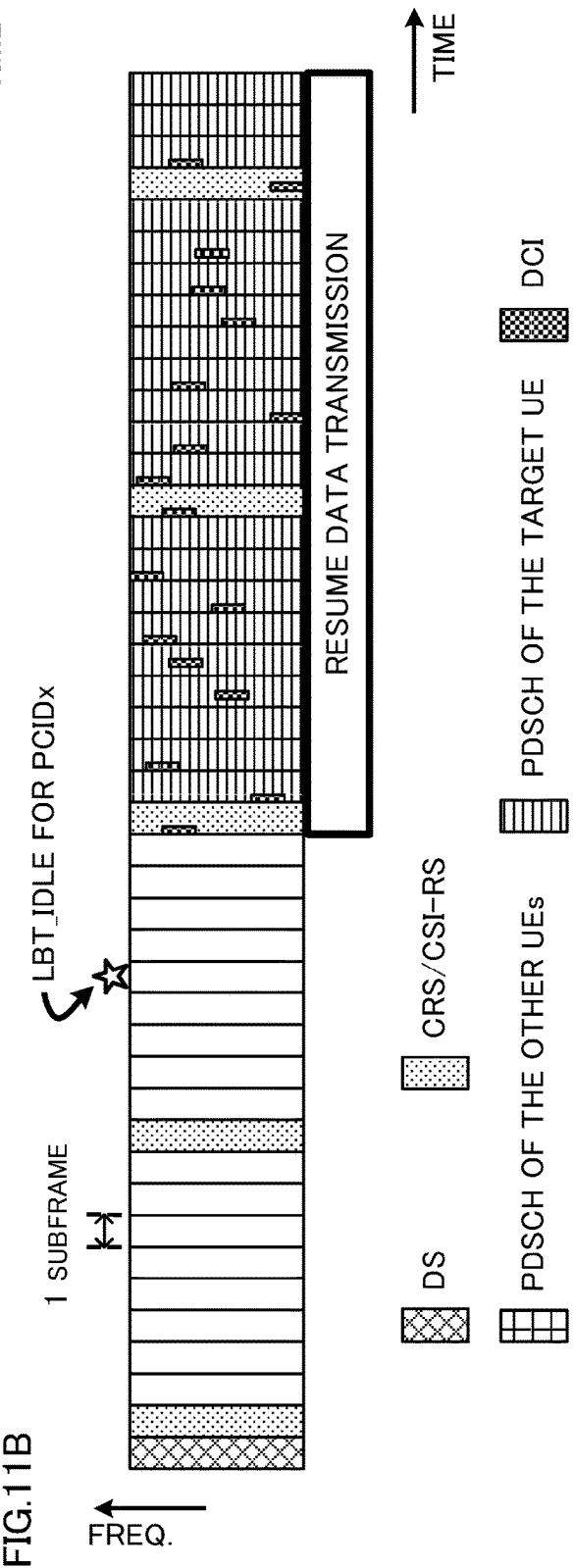
FIG.11A
FIG.11B

USER TERMINAL, RADIO BASE STATION AND RADIO COMMUNICATION METHOD

TECHNICAL FIELD

The present invention relates to a user terminal, a radio base station and a radio communication method in a next-generation communication system.

BACKGROUND ART

In a UMTS (Universal Mobile Telecommunications System) network, for the purposes of achieving higher-speed data rates, providing low delay and so on, long-term evolution (LTE) has been standardized (see Non Patent Literature 1). In LTE, as multi access schemes, an OFDMA (Orthogonal Frequency Division Multiple Access)-based scheme is used for downlink and an SC-FDMA (Single Carrier Frequency Division Multiple Access)-based scheme is used for uplink. For the purposes of achieving further broadbandization and higher speed, successor systems to LTE have been also studied and standardized (Rel. 10/11) (for example, such a system is also called "LTE advanced" or "LTE enhancement" (hereinafter referred to as "LTE-A")).

Further, in a future radio communication system (Rel. 12 or later), the LTE system has been considered as operating not only in a frequency band (licensed band) that is licensed to a communication carrier (operator), but also in a license-not-required frequency band (unlicensed band) (which system is called LTE-U: LTE Unlicensed). In LTE-U operation, if the LTE-U is operated on the basis of cooperation of the licensed band LTE (Licensed LTE), it is called LAA (Licensed-Assisted Access) or LAA-LTE. A system operating LTE/LTE-A in the unlicensed band is sometimes called LAA, LAA-LTE, LTE-U, U-LTE collectively.

The licensed band is a band that is permitted to be used exclusively by a specific operator (carrier), while the unlicensed band (also called "non-licensed band") is a band in which a radio base station is able to be installed without restriction to a specific operator. As the unlicensed band, a 2.4 GHz or 5 GHz band, in which Wi-Fi (registered trademark) and Bluetooth (registered trademark) are available, and a 60 GHz band, in which milli-meter wave is available, have been considered to be used. This unlicensed band has been also considered to be applied to a small cell.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

The existing LTE is expected to operate in the licensed band and therefore, operators are assigned with mutually different frequency bands. However, as for the unlicensed band, its use is not limited to a specific operator, unlike the licensed band. In addition, use of the unlicensed band is not limited to a specific radio system, unlike the licensed band (for example, operation in the licensed band is limited to LTE, Wi-Fi or the like). Therefore, the frequency band used by LAA of a certain operator may overlap a frequency band used by LAA of another operator or Wi-Fi.

When operating LTE/LTE-A system (LTE-U) in the unlicensed band, installation of radio access points (also called AP, TP) and radio base stations (eNB) is also expected to be performed without coordination and cooperation between different operators and non-operators. In this case, dense cell planning and interference control are difficult to execute, which may cause great mutual interference in the unlicensed band, unlike in the licensed band.

Then, in order to avoid mutual interference in the unlicensed band, an LTE-U base station/user terminal performs listening (sensing) prior to signal transmission and checks if another base station/user terminal is in communication. This listening operation is called LBT (Listen Before Talk).

However, there is a problem that synchronization and coordinated control of the radio communication system are difficult between different operators. For example, when a radio base station performs LBT, it is difficult to make control in consideration of an interference state at a user terminal. Besides, in the conventional LTE system, scheduling is performed by the user terminal feeding back a measured channel state, but it is difficult to specify an operator that causes interference in the unlicensed band. This may result in reduction in radio resource usage efficiency.

The present invention was carried out in view of the foregoing and aims to provide a user terminal, a radio base station and a radio communication method capable of, in an LTE/LTE-A operating system, minimizing reduction of radio resource usage efficiency even when the radio base station performs LBT.

Solution to Problem

The present invention provides a user terminal capable of communicating with a radio base station of a given operator using an unlicensed band, the user terminal comprising: an obtaining section that obtains a PLMN-ID (Public Land Mobile Network Identifier) of a cell that is detected in a cell search; a detecting section that detects the cell of an other operator cell that is different from the given operator based on the PLMN-ID; and a transmission section that transmits an identifier to specify the cell of the other operator and the PLMN-ID of the other operator to the radio base station.

Advantageous Effects of Invention

According to the present invention, it is possible to minimize reduction of radio resource usage efficiency in an LTE/LTE-A operating system, even when the radio base station performs LBT.

BRIEF DESCRIPTION OF DRAWINGS

FIG. 11 provides diagrams illustrating an example of data transmission control based on LBT in consideration of another operator cell;

DESCRIPTION OF EMBODIMENTS

FIG. 1 provides diagrams illustrating an example of operation of a radio communication system operating LTE in the unlicensed band (LTE-U). As illustrated in FIG. 1, there are expected a plurality of scenarios for using LTE in an unlicensed band, such as carrier aggregation (CA), dual connectivity (DC) and stand-alone.

Figure 1A:
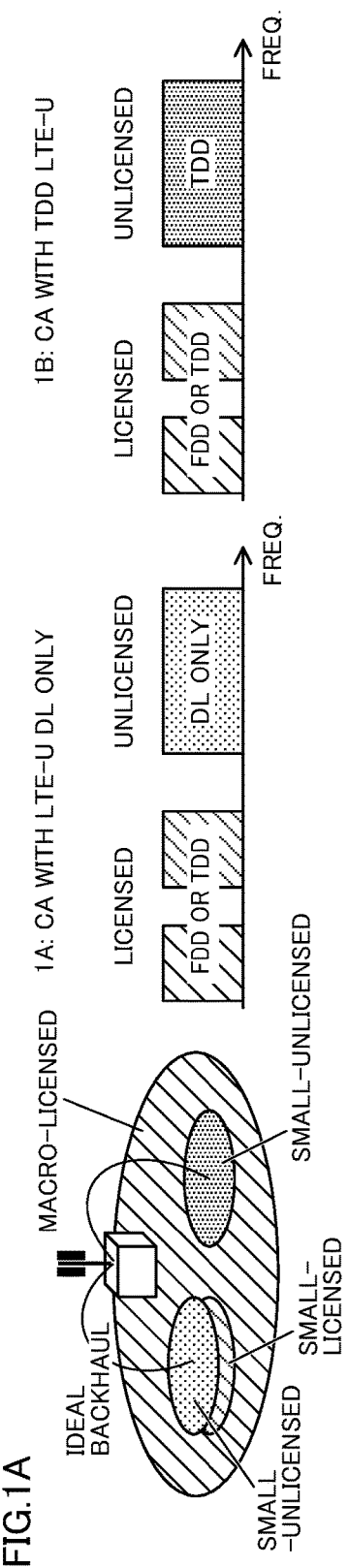
FIG. 1 provides diagrams illustrating an example of a radio communication system using LTE in an unlicensed band.

FIG. 1A illustrates a scenario in which carrier aggregation (CA) is applied using licensed and unlicensed bands. CA is a technique of aggregating a plurality of frequency blocks (also called "component carriers" (CCs), carriers or cells) into a broad band. Each CC has a bandwidth of, for example, maximum 20 MHz and, for example, five CCs are aggregated into a broad band of maximum 100 MHz.

In the example illustrated in FIG. 1A, CA is applied to a macro cell and/or a small cell using the licensed band and a small cell using the unlicensed band. When CA applies, a scheduler of one radio base station is configured to control scheduling of a plurality of CCs. According, CA may be called intra-base station CA (intra-eNB CA).

In this case, the small cell using the unlicensed band may use a carrier dedicated for DL transmission (scenario 1A) or use a TDD carrier (scenario 1B). The carrier dedicated for DL transmission is also called supplemental downlink (SDL). Here, in the licensed band, FDD and/or TDD may be used.

Further, it may be configured that the licensed and unlicensed bands are transmitted and received by one transmission/reception point (for example, radio base station) (Co-located). In this case, the transmission/reception point (for example, LTE/LTE-U base station) may perform communication with a user terminal by using both of the licensed band and the unlicensed band. Otherwise, it may be configured that the licensed band and the unlicensed band are transmitted and received by different transmission/reception points (for example, one is a radio base station and the other is an RRH (Remote Radio Head) connected to a radio base station) (non-co-located).

Figure 1B:
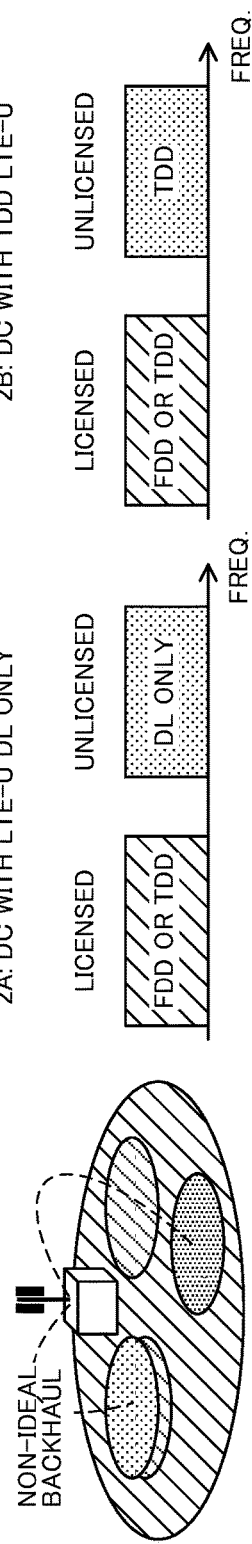

FIG. 1B illustrates a scenario in which dual connectivity (DC) is applied using the licensed and unlicensed bands. DC is identical to CA in that a plurality of CCs (or cells) are aggregated into a broad band. On the other hand, CA is based on the premise that CCs (or cells) are connected by ideal backhaul and coordinated control is possible with extremely small delay time, while DC is based on the premise that cells are connected by non-ideal backhaul with unignorable delay time.

Accordingly, in DC, cells are operated by different base stations and a user terminal performs communication by connecting to cells (or CCs) of different frequencies operated by different base stations. Therefore, when DC applies, a plurality of schedulers are provided independently and each of the plural schedulers controls scheduling of one or more cells (CCs) managed by itself. Therefore, dual connectivity may be called inter-base station CA (inter-eNB CA). Here, in DC, carrier aggregation (intra-eNB CA) may be applied per scheduler provided independently.

In the example illustrated in FIG. 1B, DC applies to the macro cell using the licensed band and the small cell using the unlicensed band. In this case, the small cell using the unlicensed band may use a carrier dedicated for DL transmission (scenario 2A) or use a TDD carrier (scenario 2B). Here, the macro cell using the licensed band may adopt FDD and/or TDD.

Figure 1C:
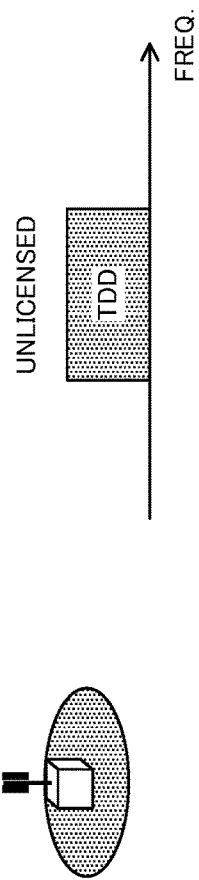

In the example illustrated in FIG. 1C, stand-alone (SA) is applied in which a cell operating LTE in the unlicensed band is configured to operate alone. This stand-alone means that communication with a terminal is enabled without application of CA or DC. In this case, the unlicensed band may be used as the TDD carrier (scenario 3).

Figure 2:
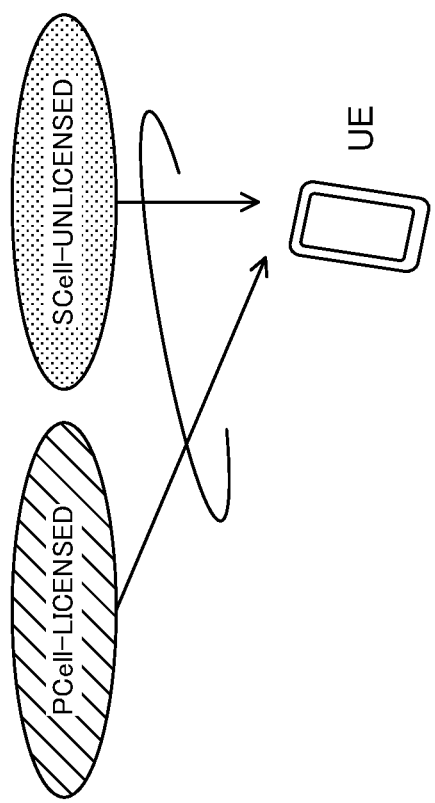
FIG. 2 is a diagram illustrating an example of the radio communication system using LTE in the unlicensed band.

FIG. 2 illustrates an example of operation of a radio communication system (LTE-U) operating LTE in the unlicensed band. In the CA/DC operation illustrated in FIGS. 1A and 1B, for example, as illustrated in FIG. 2, the licensed band CC (macro cell) may be used as a primary cell (PCell) and the unlicensed band CC (small cell) may be used as a secondary cell (SCell). Here, the primary cell (PCell) is a cell for managing RRC connection and handover when performing CA/DC and is a cell that needs UL transmission of data and feedback signals from terminals. The primary cell is always configured for both of uplink and downlink. The secondary cell (SCell) is a different cell that is configured in addition to the primary cell when CA/DC applies. The secondary cell may be configured only for downlink or may be configured simultaneously both for uplink and downlink.

As illustrated in FIG. 1A (CA) and FIG. 1B (DC) mentioned above, LTE-U operation assuming licensed band LTE (Licensed LTE) is called LAA (Licensed-Assisted Access) or LAA-LTE. The LTE/LTE-A operating system in the unlicensed band may be collectively called LAA, LAA-LTE, LTE-U, U-LTE or the like.

In LAA, the licensed band LTE and unlicensed band LTE cooperate with each other to communicate with a user terminal. In LAA, if the transmission point (e.g., radio base station) using the licensed band and the transmission point using the unlicensed band are far away from each other, they may be connected via the backhaul link (for example, optical fiber, X2 interface or the like).

Here, since the existing LTE is configured to operate with the licensed band, each operator is allocated with a different frequency band. However, use of the unlicensed band is not limited to a specific carrier, unlike the licensed band. Therefore, a frequency band used by LTE-U of an operator may overlap a frequency band used by the LAA system of another operator or Wi-Fi system.

In operation with the unlicensed band, the LTE may is operated without synchronization, cooperation and/or coordination between different operator systems and non-operator systems. In such a case, in the unlicensed band, multiple operators and systems are to share the same frequency, which may cause mutual interference.

Accordingly, in Wi-Fi system operated in the unlicensed band, resource allocation is performed such that whole of the band is used exclusively by a specific user during a given period. In Wi-Fi, in order to avoid collision between transmission signals of user terminals, access points and so on, Carrier Sense Multiple Access/Collision Avoidance (CSMA/CA) based on the LBT (Listen Before Talk) mechanism has been adopted. Specifically, each transmission point (TP), access point (AP), Wi-Fi terminal (STA: Station) or the like is configured to perform listening (CCA: Clear Channel Assessment) before transmission and only if there is no signal exceeding a given level, then, it performs transmission.

Thus, the LBT is expected to be required even in the LTE/LTE-A system operating in the unlicensed band (for example, LAA system). As the LAA system introduces the LBT, it is possible to avoid interference between LAA and a different RAT (Radio Access Technology) (Inter-RAT interference). In addition, it is also possible to avoid interference between LAA systems. Specifically, even when control of connectable user terminals is performed independently per LAA system operator, it is possible to reduce interference between operators (inter-operator LTE-U interference) without recognizing their control contents by LBT.

Further, interference in LAA systems of the same operator (Intra-operator LTE-U interference) may be addressed by cell planning, interference control between cells (ICIC: Inter-Cell Interference Coordination) or the like. As for synchronization cells, interference can be also reduced by using a highly-functional terminal (Advanced Receiver) supporting IRC (Interference Rejection Combining).

In the LTE system employing LBT, an LTE-U base station and/or a user terminal performs listening (LBT) before transmitting a signal in the unlicensed band cell and if it detects no signal from another system (for example, Wi-Fi) or another LAA transmission point, the LTE-U base station and/or user terminal performs communication in the unlicensed band. For example, when reception power measured in LBT is equal to or less than a given threshold, the channel is determined to be idle (LBT_idle) and transmission is performed. The indication "the channel is idle" means, in other words, that the channel is not occupied by any other given systems, which is also called "channel is clear" or "channel is free".

On the other hand, when the listening result shows detection of a signal from another system or another LAA transmission point, processing is performed such as (1) transition to another carrier by DFS (Dynamic Frequency Selection), (2) transmission power control (TPC), (3) suspending signal transmission (standby), and so on. For example, if reception power measured by LBT exceeds a given threshold, the channel is determined to be busy (LBT_busy) and transmission is not performed. In the case of LBT_busy, the channel becomes available only after elapse of a given backoff time. Here, determination of the channel state between idle and busy by LBT may be performed by any other method.

FIG. 3 is a diagram for explaining the operation entity of LBT in the LTE/LTE-A operating system in the unlicensed band. FIG. 3 illustrates a radio base station forming an unlicensed band cell (eNB), a user terminal (UE) and downlink (DL)/uplink (UL) between them. In the unlicensed band cell, listening (LBT) is performed before signal transmission and it is checked whether a transmission of another system (for example, Wi-Fi) or another LAA (LTE-U) transmission point is now in communication or not.

Figure 3B:
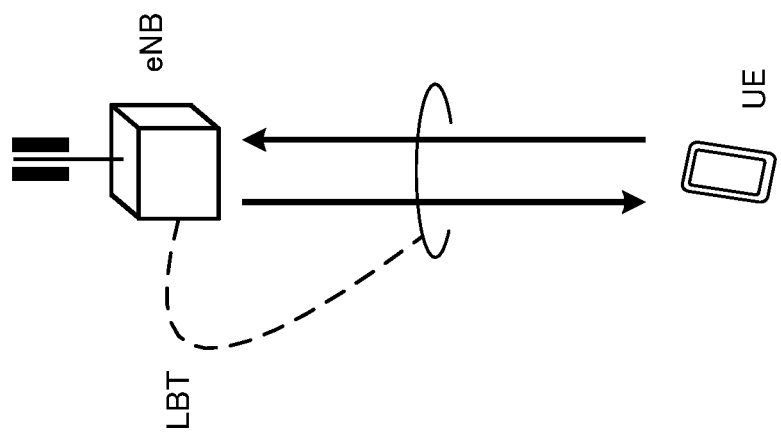
FIG. 3 provides diagrams for explaining the operation entity of LBT in the LTE/LTE-A operating system in the unlicensed band.
Figure 3A:
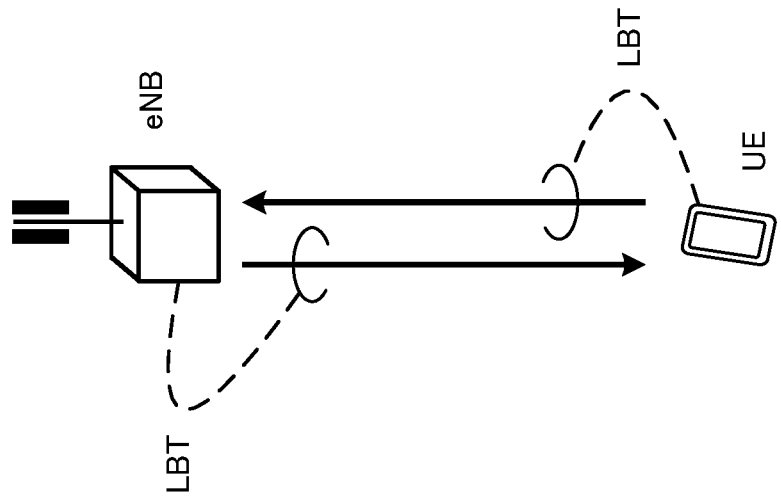

FIG. 3A illustrates an example in which eNB performs LBT in both of DL and UL. In this case, after eNB determines that the channel is clear by LBT, eNB provides a given signal (for example, UL grant) to UE and thereby, the UE is able to perform UL transmission. On the other hand, FIG. 3B illustrates LBT performed by the transmission side. In this case, eNB performs LBT in DL transmission, while UE performs LBT in UL transmission.

Figure 4:
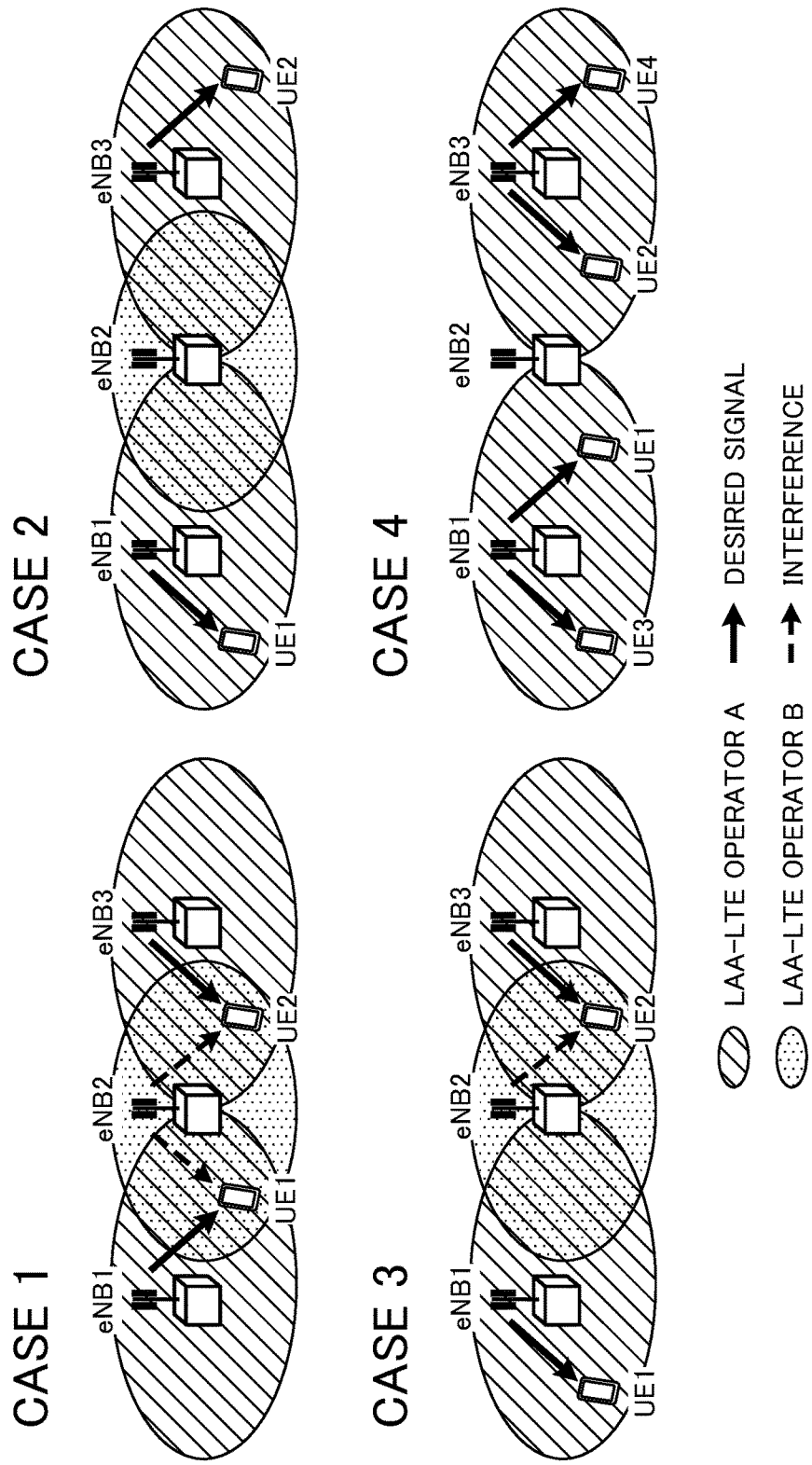
FIG. 4 provides diagrams for explaining an example of interference in a user terminal where two LAA systems coexist.

As illustrated in FIG. 3, in downlink communication, the radio base station performs LBT. However, as for LBT performed by the radio base station, it is sometimes difficult to grasp the interference state in the user terminal. FIG. 4 provides diagrams explaining cases of the interference state in the user terminal where two LAA systems coexist.

In FIG. 4, cases 1 to 4 are shown. In each case, there are eNB1 and eNB3 as radio base stations of LAA-LTE operated by operator A (LAA-LTE operator A) and eNB2 as a radio base station of LAA-LTE operated by operator B (LAA-LTE operator B). Further, user terminals (UE1 through UE4) capable of communications in LAA-LTE of the operator A are located in a cell formed by the radio base station eNB1 or eNB3.

In case 1, UE1/UE2 are subjected to strong interference from the other operator (operator B). In this case, eNB1/eNB3 should not perform transmission to these UEs.

In case 2, UE1/UE2 are not subjected to interference from the other operator (operator B). In this case, eNB1/eNB3 may perform transmission to these UEs.

In case 3, UE1 is not subjected to interference from the other operator (operator B). On the other hand, UE2 is subjected to strong interference. In this case, eNB1 may perform transmission to UE1, but eNB3 should not perform transmission to UE2.

In case 4, eNB2 does not transmit signals particularly. In this case, UE1 through UE4 are not subjected to interference from the other operator (operator B) and eNB1/eNB3 may perform transmission to these UEs.

In any case of FIG. 4, eNB1/eNB3 are placed out of the coverage of the other operator cell formed by eNB2, and he LBT result shows that eNB1/eNB3 becomes clear (LBT_idle). Accordingly, LBT only performed by the radio base station is not enough to distinguish the four cases of FIG. 4 from each other.

In addition to the cases of FIG. 4, there may be another case in which the radio base station determines that channel is busy by LBT and stops transmission, but in fact, the user terminal is not subjected to interference and is capable of receiving transmission from the radio base station, if any, without problem.

In conventional LTE, the radio base station performs transmission control (scheduling) based on CQI (Channel Quality Information) included in feedback information (for example, CSI: Channel State Information) from the user terminal. On the other hand, in LAA-LTE unlicensed band, for example, if receiving a report of low CQI, the radio base station is not able to recognize (determine) whether the low CQI is due to interference from another operator or not.

Further, in transmission control based on a feedback from the user terminal (determination whether transmission is enabled or not), there is a risk that appropriate determination is not able to be performed due to feedback delay. For example, even if no interference is detected in measurement by the user terminal and its measurement result is fed back to the radio base station, the user terminal may be subjected to interference at the time when the radio base station receives the feedback.

Furthermore, in conventional LTE, the radio base station performs SCell change based on an RRM (Radio Resource Management) measurement report from the user terminal. On the other hand, in the LAA-LTE unlicensed band, when the user terminal is subjected to interference from another operator, SCell change is considered ineffective.

Figure 5A:
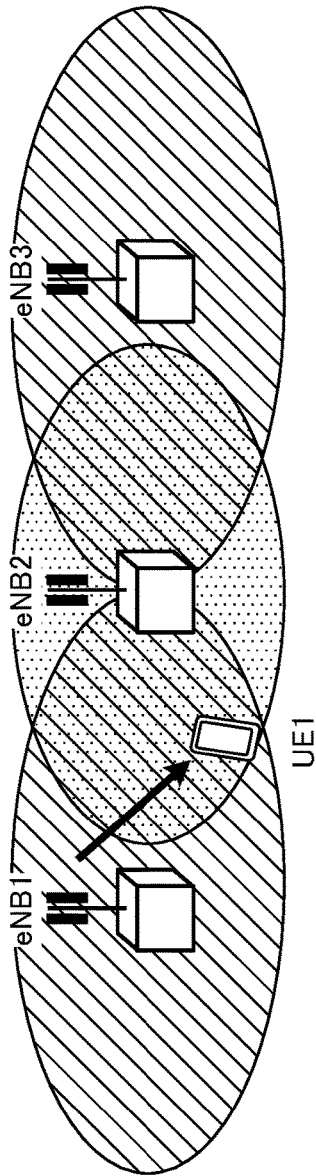
FIG. 5 provides diagrams illustrating an example of SCell change at the use terminal where two LAA systems coexist.
Figure 5B:
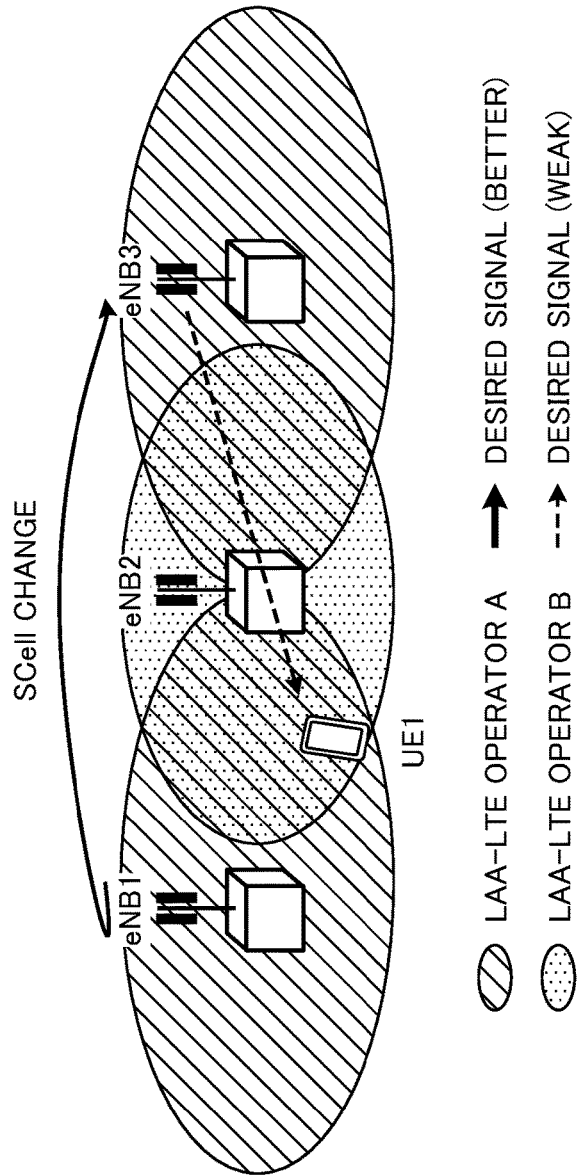

FIG. 5 provides diagrams illustrating an example of SCell change in the user terminal where two LAA systems coexist. The user terminal (UE1) in FIG. 5A is in the same interferences state as UE1 in case 1 of FIG. 4. Note that UE1 performs an RRM measurement report to the radio base station of operator A (for example, eNB1). The radio base station of the operator A performs SCell change from eNB1 to eNB3 based on the report (FIG. 5B). However, eNB2 as interference source is not controlled at all, and then reception power of SCell is not improved.

Figure 6:
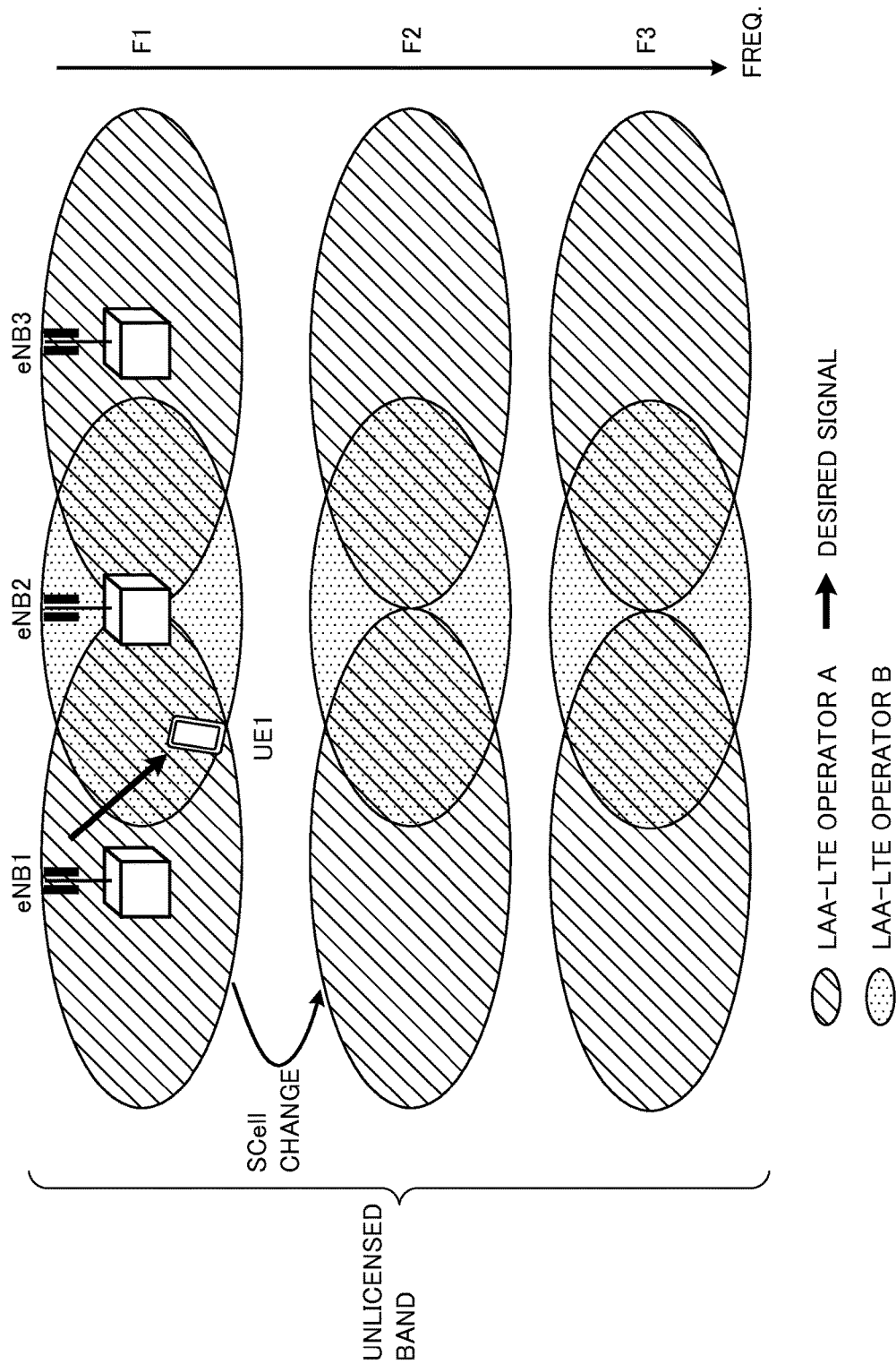
FIG. 6 is a diagram illustrating another example of SCell change at the use terminal where two LAA systems coexist.

In addition, FIG. 6 is a diagram illustrating another example of SCell change for the user terminal where two LAA systems coexist. The example of FIG. 6 is different from that of FIG. 5 in that SCell change is performed in the frequency domain (carrier frequency is changed from F1 to F2). However, if the operators use the same frequency band (here, both operator A and operator B use F1, F2 and F3), the interference is not affected by SCell change.

As explained above, by using LBT in the radio base station, it is possible to perform transmission control in accordance with reception strength and reception quality in a radio base station of another peripheral operator and so on. However, in the conventional LBT-base control, the interference state of the user terminal as a signal destination from the cell of another operator cannot be reflected appropriately, and there is a rink of reduction of the usage efficiency of radio resources.

Then, the present inventors have found that in a system operating LTE/LTE-A, when the radio base station performs LBT, the radio base station performs scheduling in consideration of interference in the user terminal from another operator cell. Based on this idea, the present inventors have decided to perform ICIC based on RRM measurement between operator cells and LBT.

According to an embodiment of the present invention, the radio base station is able to grasp the influence of interference from another operator by accurate RRM measurement in the user terminal, thereby eliminating unnecessary SCell change and performing appropriate control (for example, SCell deactivation/de-configuration, high-speed stop/resume of data transmission, etc.).

Further, according to the embodiment of the present invention, the above-mentioned RRM measurement is performed in combination with signal detection between operators (cross-correlated signaling detection), thereby making it possible for a radio base station to dynamically turn on/off data transmission to a given user terminal.

Furthermore, according to the embodiment of the present invention, it is possible to perform interference reduction control by detecting a transmission state of another operator cell, even though information change is restricted between operators. For example, effective communication is able to be realized by performing communication while avoiding terminals that are subjected to interference from other operator cells. With this invention, in a LTE/LTE-A system where the radio base station performs LBT, it is possible to prevent reduction of the usage efficiency of radio resources.

As described above, the present invention comprises the RRM measurement between operators (First Embodiment) and ICIC based on LBT (Second Embodiment). In the following description, with reference to the accompanying drawings, each embodiment will be explained in detail by way of specific examples. Note that the following description is given with an example where LBT is used in the LTE-U operation mode (LAA) based on the existing of the licensed band, but the embodiments are not limited to this. In addition, it is assumed that the radio base station performs LBT and the user terminal does not perform LBT, but the user terminal may be configured to be able to perform LBT.

In addition, in the description, it is assumed that measurement and control are performed to reduce interference on the user terminal of operator A (UE in Operator A) connected to the serving cell of the operator A (Operator A serving cell), from the serving cell of the operator B (Operator B serving cell). In this case, the serving cell of the operator B is also referred to as an interfering cell of the operator B (Operator B interfering cell). Further, the configuration to which the present invention applies is not limited to this, and may be different in the number of cells and the network configuration.

First Embodiment: Inter-Operator Cell RRM Measurement

The first embodiment is such that RRM measurement of another operator cell is performed when the user terminal detects the other operator cell. With this process, the radio base station is able to know which terminal and which other operator are close to.

In the first embodiment, inter-operator cell RRM measurement is triggered on a given condition (measurement instruction). For example, the given condition may be met when the radio base station receives, from the user terminal, information about another operator cell in proximity of the user terminal (for example, operator cell in which the user terminal is located). Here, information about the other operator cell in proximity to the user terminal is also called Proximity indication.

Proximity indication includes PLMN-ID related to a given cell of another operator (Public Land Mobile Network Identifier) and ECGI (E-UTRAN Cell Global Identifier) (or PCID (Physical Cell Identifier)). Information included in the Proximity indication is not limited to these. For example, it may include information of entering a given cell or leaving the cell, or may include information about a carrier frequency of the cell.

Note that for a given user terminal, PLMN-ID of another operator is PLMN-ID that does not correspond to any of HPLMN (Home PLMN) and EHPLMN (Equivalent HPLMN).

Figure 7:
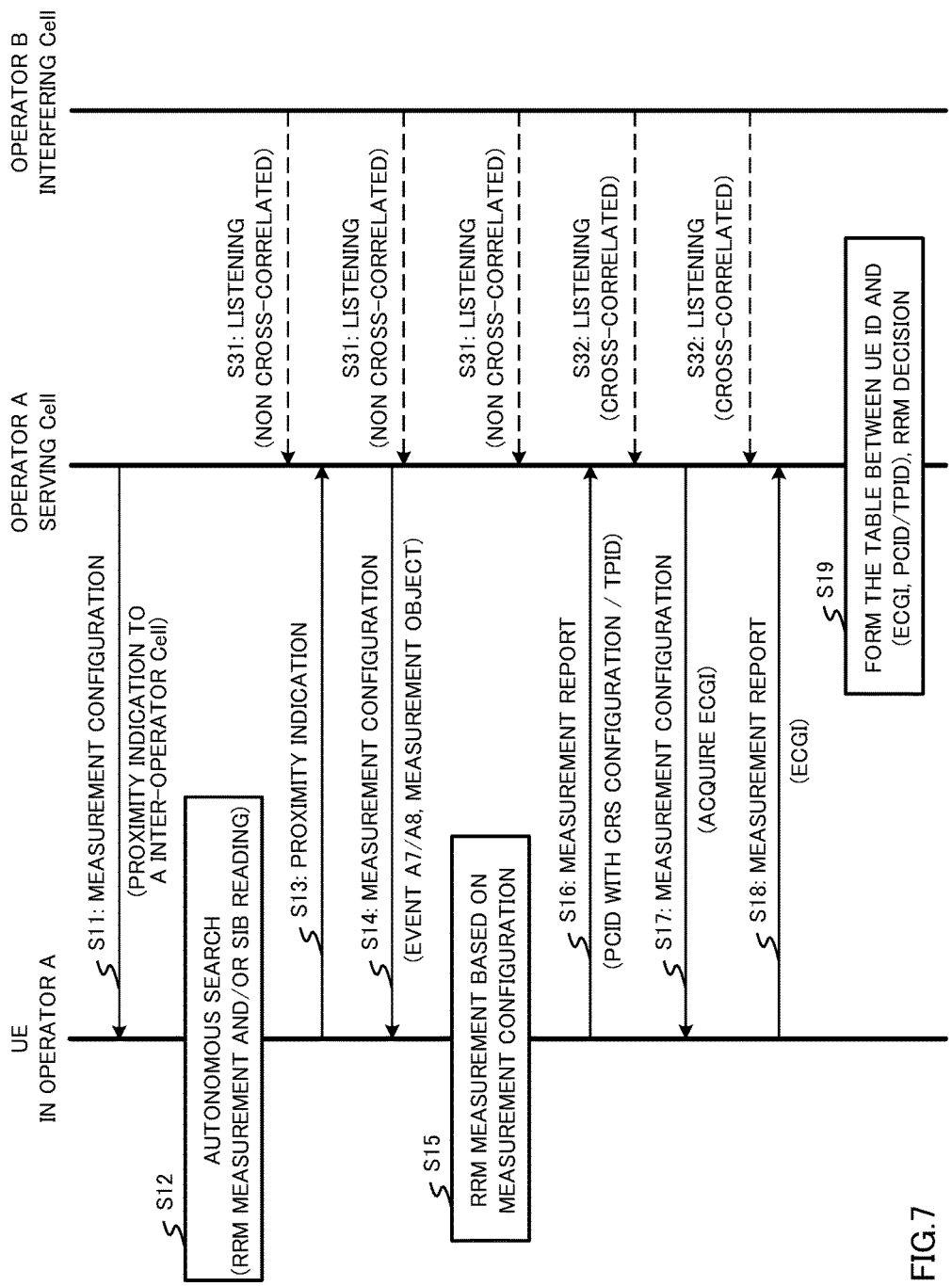
FIG. 7 is a sequence diagram illustrating an example of RRM measurement processing between operator cells according to a first embodiment of the present invention.

FIG. 7 is a sequence diagram illustrating the RRM measurement processing between operator cells according to the first embodiment of the present invention. First, the radio base station performs configuration of Proximity indication (Measurement configuration) (step S11). Specifically, the radio base station provides a message including information about PLMN-IDs of other operators (for example, PLMN-ID list) to the user terminal. Here, as for a base station near which there is no other operator cell, it does not perform this configuration on the user terminal. Therefore, it is possible to prevent the user terminal from finding other operator cells unnecessarily.

The user terminal with the above-mentioned configuration performs search for other operator cells autonomously (Autonomous search) (step S12). Specifically, after cell search, the user terminal demodulates system information of a detected cell (for example, SIB1) and tries to find PLMN-ID included in the received list.

The radio base station may provide PLMN-IDs in whitelist (report once a cell of the received PLMN-ID is detected) or may provide in blacklist (not report a cell of the received PLMN-ID). Since reporting is performed based on the list, it is possible to reduce the signaling amount.

The PLMN-ID may be obtained by a given signal transmitted in the unlicensed band (RRM measurement). For example, the given signal may be a new reference signal or a new broadcast signal (including modification of the existing reference signal/broadcast signal) or any combination of them. The radio base station may transmit, for example, a reference signal including a sequence scrambled by PLMN-ID or a broadcast signal including PLMN-ID only by using a specific resource periodically. The given signal may include a signal in the existing system (for example, LTE Rel-11).

When interference from a given cell is strong, the user terminal is able to demodulate system information of the cell suitably. Accordingly, configuration in step S11 may include information about whether cell detection is performed based on demodulation of the system information or based on a reference signal and/or a broadcast signal. This enables robust cell detection.

When PLMN-ID of a report target is discovered based on the received list in step S12, then, reporting of Proximity indication is performed (step S13). Specifically, the discovered PLMN-ID and ECGI of its corresponding cell (or PCID) are reported to the radio base station. With this reporting, the radio base station is able to recognize the proximity state of the user terminal to another operator cell.

The radio base station may perform determination that there is another operator cell in proximity to the user terminal based on information other than Proximity indication. For example, by performing normal LBT, the radio base station may be able to measure an interference state from other operator cells and perform the above-mentioned determination.

Further, the radio base station may be able to perform the above-mentioned determination based on an RRM measurement report in the operator by the user terminal. For example, Event A2 is a trigger to transmit a measurement report when reception quality of a serving cell (RSRQ: Reference Signal Received Quality) is lower than a threshold and this measurement report may be used to make the above-mentioned determination.

Further, the LBT result and RRM measurement may be combined to perform the above-mentioned determination. For example, when the LBT result shows busy and the radio base station receives a report of Event A2 from the user terminal, the radio base station may be able to determine that another operator cell is in proximity to the user terminal.

Next, the radio base station provides configuration of RRM measurement of another operator cell (RRM measurement configuration) to the user terminal that has reported the proximity state to the other operator cell (step S14).

Configuration for RRM measurement of another operator cell includes measurement ID and measurement object. Here, when the measurement signal configuration, timing of another operator cell, etc. are already known, the radio base station may configure the user terminal with these information pieces as the measurement object. For example, the user terminal is able to specify a radio resource of a measurement target signal appropriately based on these information pieces, thereby achieving reduction in the measurement load.

Measurement signals as used may include, for example, CRS (Cell-specific Reference Signal), CSI-RS (Channel State Information Reference Signal), DRS (Discovery Reference Signal) and so on. Here, the DRS is a detection measurement signal that is transmitted from a small cell and is used to detect (synchronize, measure) the small cell by the use terminal. When the DRS is configured to be used, RRM measurement for another operator cell becomes measurement using DRS (DRS based measurement). The DRS may be also called DS (Discovery Signal).

The above-mentioned measurement signal configuration and timing information as used may include, for example, the number of antenna ports of CRS, the CSI-RS configuration. Further, a parameter related to DRS used by another operator may be included in MeasObjectEUTRA and provided to the user terminal. Since the measurement signal configuration and timing information are not changed frequently, they are able to be obtained and/or estimated as for signals of other operators.

DRS may be configured of a given signal transmitted in a subframe or of a combination of a plurality of signals transmitted in a given period N (for example, maximum 5 ms (five subframes)). DRS may be transmitted at a given cycle M (for example, 40, 80, 160 ms). N and M may be called DRS measurement period (or DRS occasion) and DRS cycle.

DRS may be configured of combination of a synchronization signal (PSS (Primary Synchronization Signal)/SSS (Secondary Synchronization Signal)) and CSR in the existing system (for example, LTE Rel-11) or combination of a synchronization signal (PSS/SSS), CRS and CSI-RS in the existing system. Note that DRS is not limited to these. For example, DRS may include a new reference signal (including a modification from an existing reference signal).

Further, configuration for RRM measurement includes configuration of an event trigger for measurement report. This event trigger may be configured of either or both of the following two items: (1) Event A7 (when RSRP (Reference Signal Received Power) of another operator cell exceeds a threshold) and (2) Event A8 (When RSRP of an unlicensed band cell of its own operator (for example, SCell) is lower than a first threshold and RSRP of an unlicensed band cell of another operator (for example, SCell) exceeds a second threshold). These triggers may be configured not only for RSRP, but also for RSRQ, SINR (Signal-to-Interference plus Noise Ratio). The trigger is not limited to these two, but may be any other triggers indicating other conditions.

The user terminal measures RSRP, RSRQ of a signal from another operator cell in accordance with RRM measurement configuration for the other operator cell (report event trigger, measurement cycle, timing, etc.) (step S15).

The user terminal reports the obtained measurement report to the radio base station (step S16). The measurement report can be used to update the mapping table of the proximity state in the radio base station and SCell change of the operator.

The above-mentioned measurement report preferably includes information for specifying a cell and information indicating that which signal is used to obtain the measurement result. For example, when information for specifying a cell is PCID, information about its corresponding CRS configuration (the number of antenna ports, etc.) is reported as well. Further, when DRS base measurement is configured, RRM measurement result is associated with TPID (Transmission Point Identification). Note that TPID is an ID associated with the resource configuration of CSI-RS, subframe offset, scrambling ID and so on.

In step S16 or before, the radio base station of operator A merely performs the normal LBT (non cross-correlated LBT) and does not specify interference from another operator cell (step S31). On the other hand, once step S16 is finished, the radio base station recognizes a cell of another operator B in proximity to the connecting user terminal and is able to perform LBT for the other operator (cross-correlated LBT) in consideration of the signal configuration and interference signals of the cell of the operator B (step S32).

Further, after step S16, the radio base station provides the user terminal with measurement configuration for PLMN-ID report of another operator cell (step S17). Specifically, the radio base station configures to obtain PLMN-ID and ECGI formed of PCID (configure by reportCGI included in reportConfig)

The user terminal obtains ECGI of another operator cell and provides it to the radio base station (step S18).

Finally, the radio base station performs mapping about the proximity state of the use terminal and another operator cell based on a measurement report (by generating correspondence) and performs RRM decision such as SCell deactivation/de-configuration (step S19).

Here, the above-mentioned mapping is performed based on the user terminal ID (UE ID) and ECGI and PCID/TPID. FIG. 8 is a diagram illustrating an example of mapping about the proximity state of the user terminal and another operator cell. The table summarizing correspondence of the proximity state of the user terminal and another operator cell as shown in FIG. 8 is also called mapping table.

Figure 8A:
FIG. 8 provides diagrams illustrating an example of mapping associated with a proximity condition of the user terminal and another operator cell.
Figure 8B:
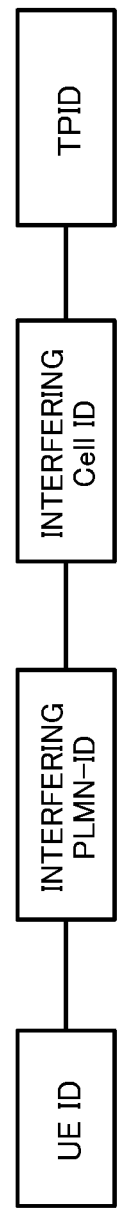

For example, as illustrated in FIG. 8A, the mapping table may be configured by associating UE ID, PLMN-ID of an interfering cell (Interfering PLMN-ID), cell ID of an interfering cell (Interfering Cell ID) (value determined uniquely in the operator network (global ID)), PCID, CRS configuration with each other. Otherwise, the mapping table may be configured, as illustrated in FIG. 8B, by associating UE ID, PLMN-ID of an interfering cell, a cell ID of the interfering cell, TPID with each other.

Second Embodiment: ICIC Based on LBT

The second embodiment shows ICIC based on LBT that is performed after mapping about the proximity state of the user terminal and the other operator cell.

Figure 9:
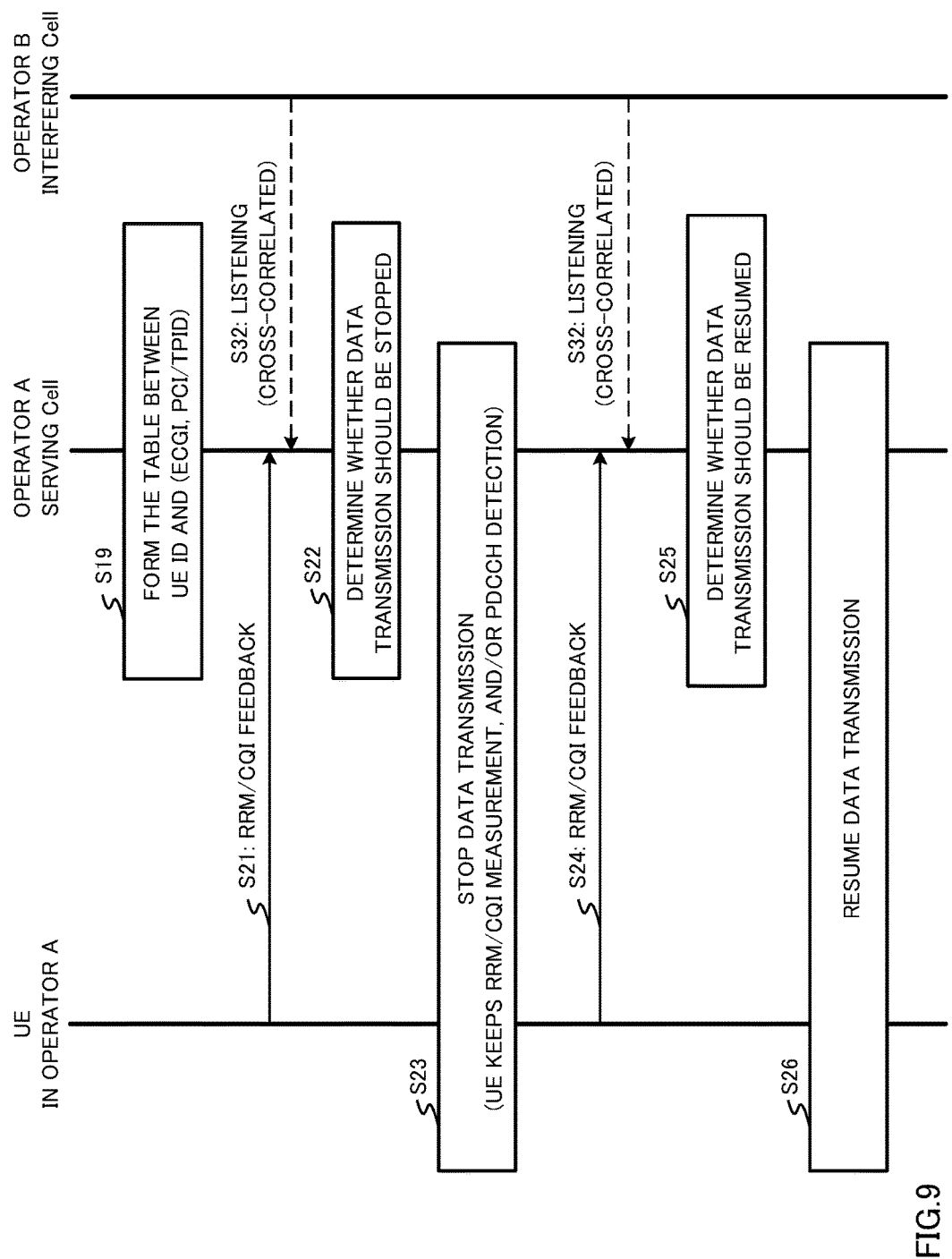
FIG. 9 is a sequence diagram illustrating an example of ICIC processing based on LBT in consideration of another operator cell according to a second embodiment of the present invention.

FIG. 9 is a sequence diagram illustrating an example of the ICIC processing based on LBT in consideration of another operator cell according to the second embodiment of the present invention. FIG. 9 assumes the process after creating the mapping table in step S19 of FIG. 7 by RRM measurement described in the first embodiment. Note that the radio base station has only to recognize information about the proximity state of the user terminal and the other operator cell and generation of the information about the proximity state is not limited to that in the first embodiment.

The user terminal performs RRM/CQI feedback periodically (step S21). Besides, the radio base station continues to perform LBT (cross-correlated LBT) for another operator periodically (step S32).

The radio base station determines whether data transmission to the user terminal should be stopped or not (step S22). This determination may be performed by either of RRM feedback, CQI feedback and the LBT result in the radio base station or combination thereof. For example, the radio base station uses the RSRP measurement result reported from the user terminal as a basis to determine whether a sum of RSRP ($RSRP_{neighbor\_operator}$) of signals of another operator is greater than a given threshold by expression 1, and if the sum exceeds the threshold, the radio base station may decide to stop the data transmission. Otherwise, the radio base station may determine whether CQI_index reported from the user terminal is smaller than a given threshold by expression 2, and if the CQI_index is smaller, the radio base station may decide to stop the data transmission.

$$\Sigma RSRP_{neighbor\_operator} > Threshold_1 \quad \text{(Expression 1)}$$

$$CQI\_index < Threshold_2 \quad \text{(Expression 2)}$$

Further, by cross-correlated LBT, it is possible to obtain substantially the same result as RSRP, RSRQ, etc. When the LBT result value (RSRP/RSRQ value) is greater than a threshold, the radio base station may determine that interference from another operator is strong (LBT_busy) and decide to stop the data transmission to the user terminal.

Note that in the radio base station, a mapping table about LBT results of signals from another operator cell is produced like in FIG. 8. FIG. 10 is a diagram illustrating an example of mapping about LBT results of signals from another operator cell.

Figures 10A, 10B:
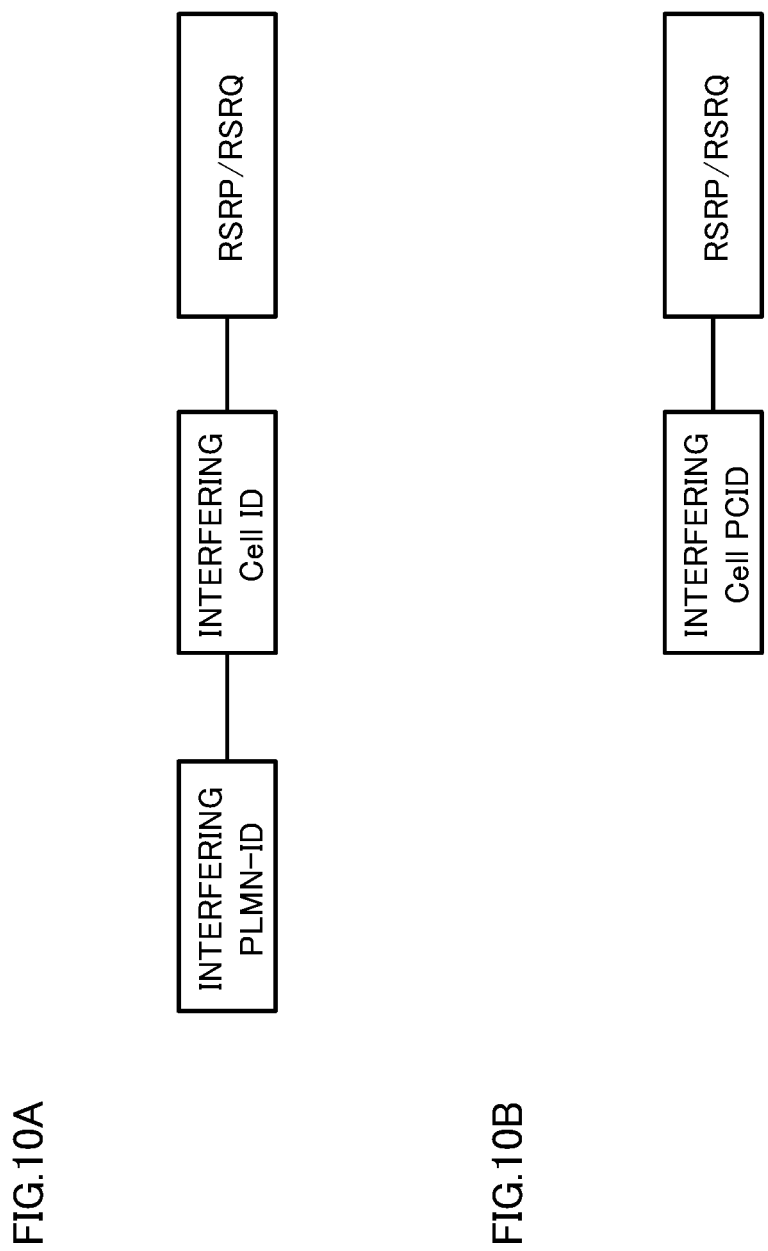
FIG. 10 provides diagrams illustrating an example of mapping associated with an LBT result of a signal of another operator cell.

For example, the mapping table may be configured, as shown in FIG. 10A, by associating PLMN-ID of an interfering cell (Interfering PLMN-ID), cell ID of the interfering cell (Interfering Cell ID) (value uniquely determined in the operator network (global cell ID)) and an LBT result (RSRP/SRSQ). In addition, the mapping table may be configured, as shown in FIG. 10B, by associating PCID of an interfering cell (which may be ECGI) and an LBT result (RSRP/SRSQ). Here, the mapping tables in FIGS. 8 and 10 may be configured separately or jointly.

When stop of data transmission is determined in step S22, the radio base station stops data transmission in the unlicensed band (step S23). Note that the operation of the user terminal during the data transmission stop period may be the same as the operation defined by dynamic ON/OFF in the small cell. For example, the user terminal does not perform the reception processing of PDSCH (Physical Downlink Shared Channel), but continues to perform RRM/CQI measurement and/or PDCCH detection.

The user terminal performs RRM/CQI feedback periodically during the data transmission stop period of the radio base station (step S24). In addition, the radio base station continues to perform cross-correlated LBT (step S32).

The radio base station determines whether the data transmission to the use terminal is resumed or not (step S25). This determination may be performed using either of RRM feedback, CQI feedback and an LBT result in the radio base station, or combination thereof. For example, based on a RSRQ measurement result reported from the user terminal, if a sum of RSRQ of signals of the other operator is a given threshold or less, the radio base station may decide to resume the data transmission. Further, when CQI index reported from the use terminal is greater than a given threshold, the radio base station may decide to resume the data transmission. Further, when the LBT result is the given threshold or less, the radio base station may determine that the interference is small (LBT_idle) and decide to resume the data transmission to the user terminal.

When the radio base station has decided to resume the data transmission in step S25, the radio base station resumes the data transmission in the unlicensed band (step S26). Note that the user terminal is able to grasp resume of the data transmission by detecting PDCCH/CRS.

FIG. 11 provides diagrams illustrating an example of control of data transmission based on LBT in consideration of another operator cell. FIG. 11A is a diagram illustrating a signal transmitted from the radio base station where the data transmission is stopped. DS (DRS), CRS/CSI-RS are transmitted periodically. For example, the user terminal performs CSI measurement using CRS/CSI-RS and performs RRM measurement using DRS. In addition, the user terminal performs PDCCH detection in a given subframe. As described above, the DRS may be formed of a plurality of subframes or may include CRS/CSI-RS, etc.

Here, also in FIG. 11A, there is a period in which data transmission is performed (PDSCH of the other UEs). This is data transmission for a cell that is not subjected to interference from another operator cell (for example, UE1/UE2 in case 2 of FIG. 4) and is not pertinent to the user terminal of which data transmission is stopped.

FIG. 11B is a diagram illustrating a signal that is transmitted from the radio base station when data transmission is stopped and then resumed. In FIG. 11B, the radio base station determines that an operator cell of which the cell ID is PCIDx is LBT_idle in a given subframe. The radio base station resumes the data transmission from a given radio frame (next radio frame in FIG. 11B) for the user terminal of which the data transmission is stopped. The user terminal recognizes that the data transmission is resumed by detecting a CRS or a PDCCH (DCI) inserted appropriately and resumes the reception processing.

(Configuration of Radio Communication System)

Next description is made about the configuration of a radio communication system according to an embodiment of the present invention. This radio communication system is applied with the radio communication methods according to the above-mentioned embodiments. The radio communication methods of the respective embodiments may be employed alone or in combination.

Figure 12:
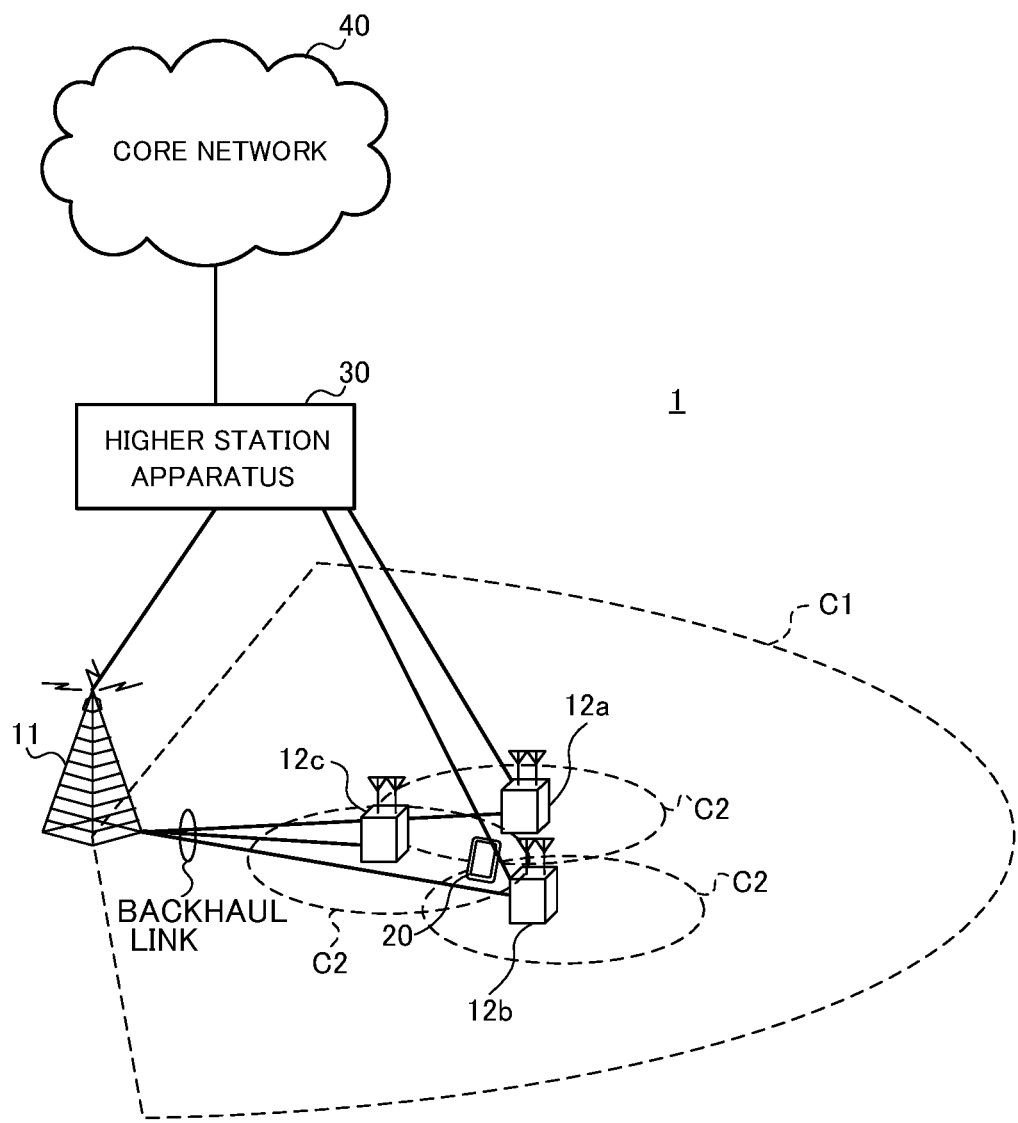
FIG. 12 is a diagram schematically illustrating a radio communication system according to an embodiment of the present invention.

FIG. 12 is a diagram schematically illustrating the configuration of a radio communication system according to an embodiment of the present invention. The radio communication system illustrated in FIG. 12 is, for example, a system covering an LTE system, SUPER 3G, LTE-A system and so on. In this radio communication system, carrier aggregation (CA) or dual connectivity (DC) can be applied by aggregating a plurality of fundamental frequency blocks (component carriers), each component carrier corresponding to the system bandwidth of the LTE system. Besides, the radio communication system illustrated in FIG. 12 has a radio base station that is able to use an unlicensed band (LTE-U base station). This radio communication system may be called IMT-Advanced, 4G, 5G, FRA (Future Radio Access) or the like.

The radio communication system 1 illustrated in FIG. 12 has a radio base station 11 forming a macro cell C1 and radio base stations 12 (12a to 12c) each forming a small cell C2 that is smaller than the macro cell C1 and is located within the macro cell C1. In the macro cell C1 and the small cells C2, a user terminal 20 is located. For example, it can be configured that the macro cell C1 is used with a licensed band and at least one of the small cells C2 is used with an unlicensed band (LTE-U). It can be also configured that in addition to the macro cell, a part of the small cells C2 is used with a licensed band and the other C2 is used with an unlicensed band.

The user terminal 20 is able to be connected to both of the radio base station 11 and the radio base stations 12. The user terminal 20 is expected to use the macro cell C1 and small cell C2 of different frequencies simultaneously by CA or DC. For example, the radio base station 11 using the licensed band may transmit assist information (for example, DL signal configuration) about the radio base station 12 (for example, LTE-U base station) using the unlicensed band to the user terminal 20. Further, when CA is carried out with the licensed and unlicensed bands, one radio base station (for example, radio base station 11) may be configured to control scheduling of the licensed and unlicensed band cells.

The user terminal 20 may be configured not to be connected to the radio base station 11 but to be connected to the radio base station 12. For example, the radio base station 12 using the unlicensed band may be connected to the user terminal 20 by standalone. In this case, the radio base station 12 controls scheduling of the unlicensed band cell.

The user terminal 20 and the radio base station 11 are able to perform communication with each other using a carrier of relatively low frequency band (for example, 2 GHz) and narrow bandwidth (called legacy carrier). On the other hand, the user terminal 20 and the radio base station 12 are able to perform communication with each other using a carrier of relatively high frequency band (for example, 3.5 GHz, 5 GHz or the like) and wide bandwidth or using the same carrier as that used in communication between the user terminal and the radio base station 11. Connection between the radio base station 11 and the radio base station 12 (or between two radio base stations 12) may be wired connection (optical fiber, X2 interface or the like) or wireless communication.

The radio base station 11 and radio base stations 12 are each connected to a higher station apparatus 30 and also connected to a core network 40 via the higher station apparatus 30. The higher station apparatus 30 includes, but is not limited to, for example, an access gateway apparatus, a radio network controller (RNC), mobility management entity (MME) and so on. Each radio base station 12 may be connected to the higher station apparatus 30 via the radio base station 11.

The radio base station 11 is a radio base station having a relatively wide coverage, may be called macro base station, aggregation node, eNB (eNodeB), transmission/reception point or the like. The radio base station 12 is a radio base station having a local coverage and may be called small base station, micro base station, pico base station, femto base station, HeNB (Home eNodeB), RRH (Remote Radio Head), transmission/reception point or the like. In the following description, the radio base stations 11 and 12 are treated collectively as a radio base station 10, unless specified otherwise.

Each user terminal 20 is a terminal supporting various communication schemes such as LTE and LTE-A and may include not only a mobile communication terminal, but also a fixed communication terminal. The numbers and locations of radio base stations 10 and user terminals in the radio communication system 1 are not restricted to those illustrated in FIG. 12.

In the radio communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to perform communications by dividing, per terminal, the system band into bands formed with one or continuous resource blocks, and allowing a plurality of terminals to use mutually different bands thereby to reduce interference between terminals. The radio access schemes used in the present invention are not limited to combination of these schemes.

In the radio communication system 1, downlink channels as used include a downlink shared channel (PDSCH: Physical Downlink Shared Channel) used by each user terminal 20 on a shared basis, a broadcast channel (PBCH: Physical Broadcast Channel), a downlink L1/L2 control channel and so on. PDSCH is used to transmit user data, higher layer control information, given SIB (System Information Block). PBCH is used to transmit MIB (Master Information Block) and so on.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. The PDCCH is used to transmit downlink control information (DCI) including scheduling information of PDSCH and PUSCH, and so on. PCFICH is used to transmit the number of OFDM symbols used by PDCCH. The PHICH is used to transmit an HARQ transmission acknowledgement signal (ACK/NACK) in response to PUSCH. The EPDCCH is frequency-division-multiplexed with PDSCH (downlink shared data channel) and may be used to transmit DCI like PDCCH.

In the radio communication system 1, the uplink channels include a PUSCH (Physical Uplink Shared Channel), which is an uplink shared channel used by each user terminal 20 on a shared basis, and a PUCCH (Physical Uplink Control Channel) and a random access channel (PRACH: Physical Random Access Channel). The PUSCH is used to transmit user data and higher layer control information. The PUCCH is used to transmit downlink radio quality information (CQI: Channel Quality Indicator), transmission acknowledgement signals, and so on. The PRACH is used to transmit a random access preamble (RA preamble) to establish connection with a cell.

Figure 13:
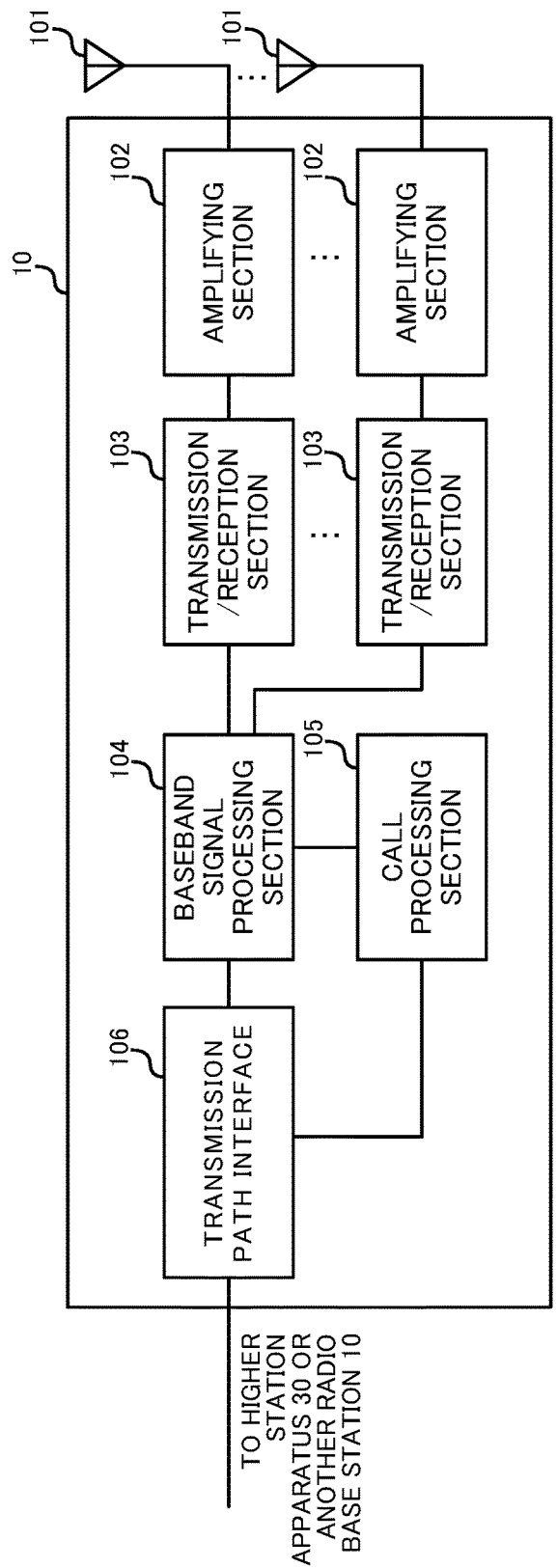
FIG. 13 is a diagram for explaining the overall configuration of a radio base station according to the embodiment of the present invention.

FIG. 13 is a diagram of an overall configuration of the radio base station 10 (including the radio base stations 11 and 12) according to an embodiment of the present invention. The radio base station 10 has a plurality of transmission/reception antennas 101 for MIMO transmission, amplifying sections 102, transmission/reception sections 103, a baseband signal processing section 104, a call processing section 105 and a transmission path interface 106. Each transmission/reception section 103 may consist of a transmission section and a reception section.

User data that is transmitted on the downlink from the radio base station 10 to the user terminal 20 is input from the higher station apparatus 30, through the transmission path interface 106, into the baseband signal processing section 104.

In the baseband signal processing section 104, user data is subjected to PDCP (Packet Data Convergence Protocol) layer processing, RLC (Radio Link Control) layer transmission processing such as division and coupling of user data and RLC retransmission control transmission processing, MAC (Medium Access Control) retransmission control, including, for example, HARQ (Hybrid Automatic Repeat reQuest) transmission processing, scheduling, transport format selection, channel coding, inverse fast Fourier transform (IFFT) processing, and precoding processing. Then, the resultant signals are transferred to each transmission/reception section 103. As for downlink control signals, transmission processing is performed, including channel coding and inverse fast Fourier transform, and the resultant signals are transmitted to each transmission/reception section 103.

Also, the baseband signal processing section 104 transmits, to each user terminal 20, control information (system information) for communication in the cell by higher layer signaling (for example, RRC signaling, broadcast information or the like). Information for communication in the cell includes, for example, uplink system bandwidth, downlink system bandwidth and so on.

In each transmission/reception section 103, baseband signals which are precoded per antenna and output from the baseband signal processing section 104 are subjected to frequency conversion processing into a radio frequency band. The radio frequency signals having been subjected to frequency conversion at the transmission/reception section 103 are amplified by the amplifying section 102, and the resultant signals are transmitted from the transmission/reception antenna 101. The transmission/reception section 103 may be configured of a transmitter/receiver, transmission/reception circuit or transmission/reception apparatus that is explained based on common knowledge in the technical field to which the present invention pertains.

The transmission/reception section 103 transmits information about PLMN-ID of another operator (for example, PLMN-ID list) to the user terminal 20. In addition, the transmission/reception section 103 receives, from the user terminal 20, information about the proximity condition with another operator cell (proximity indication) detected by the user terminal 20 based on the information about PLMN-ID and information about another operator cell (RRM measurement report, CSI feedback, ECGI, PCID associated with CRS configuration, TPID and so on).

Meanwhile, as for uplink signals, radio frequency signals are received in each transmission/reception antenna 101, and amplified in the amplifying section 102. The uplink signals amplified in the amplifying section 102 are received by the transmission/reception section 103. In the transmission/reception section 103, reception signals are subjected to frequency conversion and converted into baseband signals, and are input to the baseband signal processing section 104.

The baseband signal processing section 104 performs FFT (Fast Fourier Transform) processing, IDFT (Inverse Discrete Fourier Transform) processing, error correction decoding, MAC retransmission control reception processing, and RLC layer and PDCP layer reception processing on the user data included in the received uplink signals. Then, the resultant signals are transferred to the higher station apparatus 30 through the transmission path interface 106. The call processing section 105 performs call processing such as setting up and releasing a communication channel, manages the state of the radio base station 10 and manages the radio resources.

The transmission path interface 106 transmits and receives signals to and from the higher station apparatus 30 via given interface. The transmission path interface 106 may perform transmission and reception of signals with a neighbor radio base station 10 via inter-base station interface (for example, optical fiber, X2 interface) (backhaul signaling).

Here, the neighbor radio base station 10 may be of a cell operated by another operator. For example, the transmission path interface 106 may perform transmission and reception with the neighbor radio base station 10 of PLMN-ID of a given operator, ECGI, PCID, configuration of reference signals and/or broadcast signals including information about PLMN-ID, the signal configuration for RRM measurement, timing information, information about interference, and so on.

Figure 14:
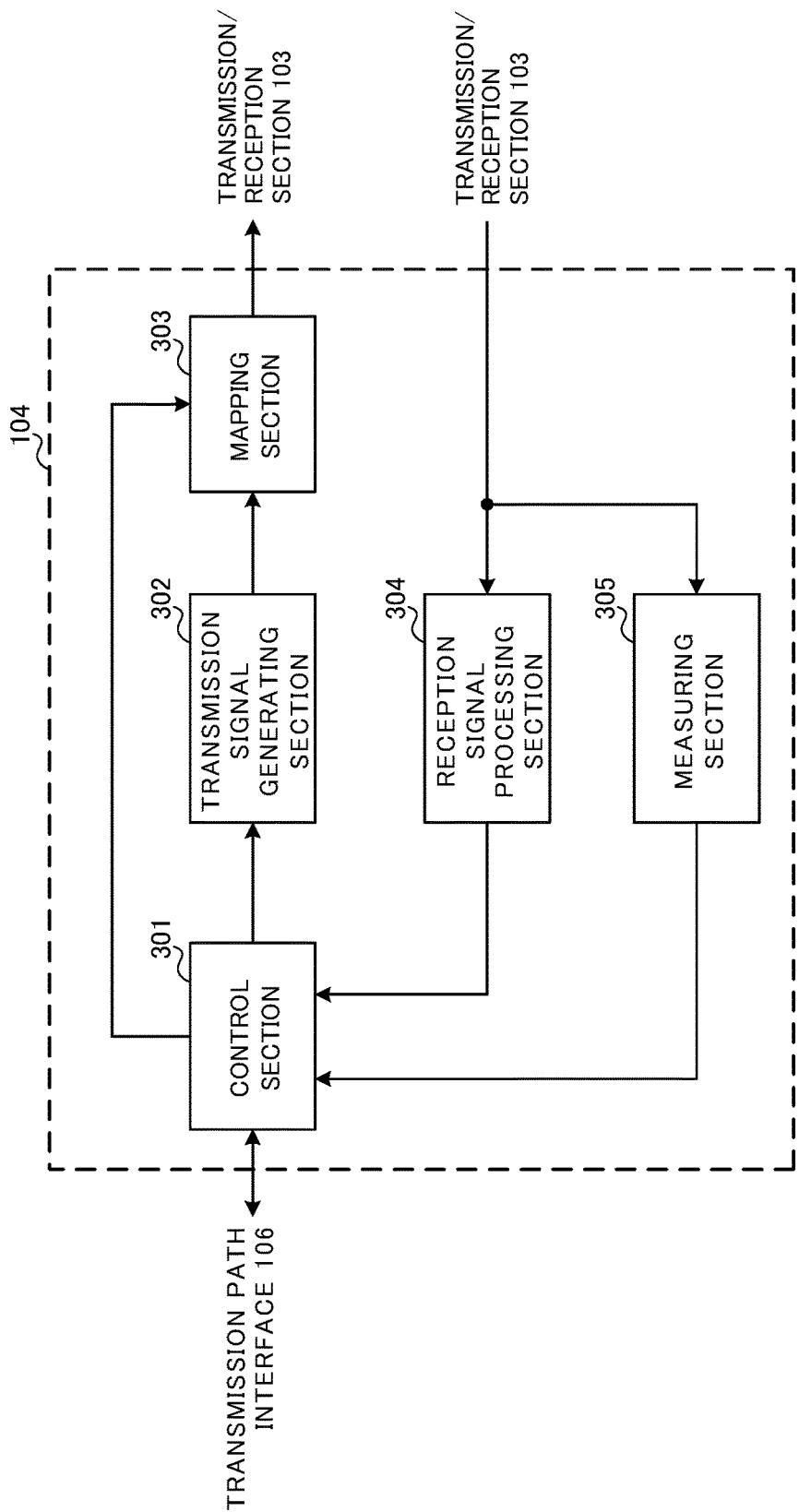
FIG. 14 is a diagram for explaining the functional configuration of the radio base station according to the embodiment of the present invention.

FIG. 14 is a diagram illustrating a functional configuration of the radio base station according to an embodiment of the present invention. The functional configuration in FIG. 14 is mainly of featuring parts according to the present embodiment, however the radio base station 10 may also have other functional blocks required for radio communication.

As illustrated in FIG. 14, the baseband signal processing section 104 provided in the radio base station 10 is configured to include a control section (scheduler) 301, a transmission signal generating section 302, a mapping section 303, a reception signal processing section 304 and a measuring section 305.

The control section (scheduler) 301 controls scheduling (for example, resource allocation) of downlink data signals to be transmitted by PDSCH and downlink control signals to be transmitted by PDCCH and/or enhanced PDCCH (EPDCCH). Besides, the control section 301 controls scheduling of downlink reference signals such as system information, synchronization signals, CRS (Cell-specific Reference Signal) and CSI-RS (Channel State Information Reference Signal). The control section 301 also controls scheduling of uplink reference signals, uplink data signals to be transmitted in PUSCH, uplink control signals to be transmitted in PUCCH and/or PUSCH, RA preamble to be transmitted in PRACH and so on.

When the licensed band and the unlicensed band are scheduled by one control section (scheduler) 301, the control section 301 controls communication of the licensed band cell and the unlicensed band cell. The control section 301 may be a controller, a control circuit or a control device that is explained based on common recognition in the technical field to which the present invention pertains.

The control section 301 controls the transmission signal generating section 302 and the mapping section 303 to transmit PLMN-ID of its own operator of the radio base station included in system information (for example, SIB1) or a broadcast signal. In addition, the control section 301 may control the transmission signal generating section 302 and the mapping section 03 to transmit a reference signal that is formed with a sequence scrambled by the PLMN-ID.

In addition, when receiving, from the reception signal processing section 304, Proximity indication provided from the user terminal 20, the control section 301 controls to configure the user terminal 20 for RRM measurement (First Embodiment).

In addition, when receiving, from the reception signal processing section 304, the information about another operator cell provided from the user terminal 20, the control section 301 controls to perform mapping about the proximity condition of the other operator cell and the user terminal 20 and RRM decision for SCell deactivaton/de-configuration.

Further, the control section 301 controls to resume/stop of data transmission in the unlicensed band (for example, PDSCH data transmission) for the user terminal 20 based on at least one of the information about another operator cell provided from the user terminal 20 and the LBT result input from the measuring section 305 (Second Embodiment).

The transmission signal generating section 302 generates DL signals (downlink control signals, downlink data signals, downlink reference signals and so on) based on an instruction from the control section 301 and outputs the signals to the mapping section 303. For example, the transmission signal generating section 302 generates a DL assignment to transmit assignment information of downlink signals and a UL grant to transmit assignment information of uplink signals based on an instruction from the control section 301. The downlink data signals are subjected to coding processing and modulation processing with a coding rate and a modulation scheme that are determined based on channel state information (CSI) from each user terminal 20. The transmission signal generating section 302 may be configured of a signal generator or a signal generating circuit explained based on common knowledge in the technical field to which the present invention pertains.

The mapping section 303 maps downlink signals generated by the transmission signal generating section 302 to radio resources based on the instruction from the control section 301 and outputs the signals to the transmission/reception section 103. The mapping section 303 may be configured of a mapper, a mapping circuit or a mapping device explained based on common knowledge in the technical field to which the present invention pertains.

The reception signal processing section 304 performs reception processing (for example, demapping, demodulation and decoding) on UL signals transmitted form the user terminal (for example, transmission acknowledgement signals (HARQ-ACK), data signals transmitted in the PUSCH). The processing results may be output to the control section 301. The reception signal processing section 304 may be configured of a signal processor, a signal processing circuit or a signal processing device explained based on common knowledge in the technical field to which the present invention pertains.

The measuring section 305 performs LBT in the unlicensed band and outputs the LBT result (for example, the determination result whether the channel state is clear or busy) to the control section 301. Here, the timing to perform LBT is not limited to "before transmission", but the LBT may be performed periodically. In addition, the measuring section 305 may measure reception power (RSRP), reception quality (RSRQ), a channel state and so on by using the received signal. The measurement result is output to the control section 301. The measuring section 305 may be a measuring unit, a measurement circuit or a measuring device as explained based on the common knowledge in the technical field to which the preset invention pertains.

When the measurement signal configuration of another operator cell and timing are already known, the measuring section 305 may measure a given radio resource to be used by the other operator cell, based on these information pieces.

Figure 15:
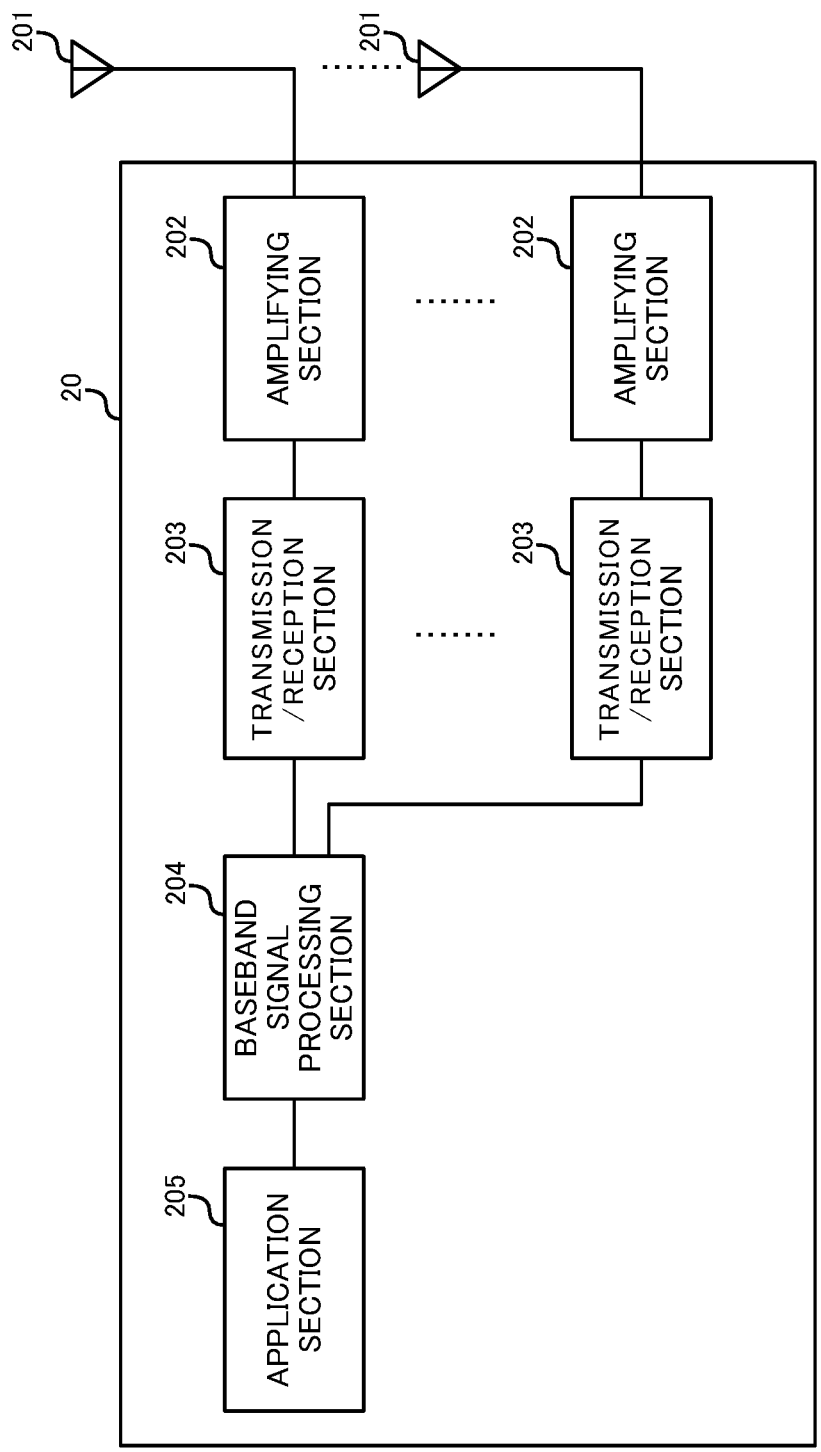
FIG. 15 is a diagram for explaining the overall configuration of a user terminal according to the embodiment of the present invention.

FIG. 15 is a diagram of an overall configuration of the user terminal 20 according to an embodiment of the present invention. The user terminal 20 has a plurality of transmission/reception antennas 201 for MIMO transmission, amplifying sections 202, transmission/reception sections 203, a baseband signal processing section 204 and an application section 205. Each transmission/reception section 203 may be configured of a transmission section and a reception section.

Radio frequency signals are received in the transmission/reception antennas 201 and are amplified in the respective amplifying sections 202. The downlink signals amplified in the amplifying sections 202 are received by transmission/reception sections 203. In the transmission/reception sections 203, the reception signals are subjected to frequency conversion into baseband signals and the converted baseband signals are outputs to the baseband signal processing section 204. Each transmission/reception section 203 may be configured of a transmitter/receiver, transmission/reception circuit or a transmission/reception device explained based on common knowledge in the technical field to which the present invention pertains. Each transmission/reception section 203 is able to transmit/receive DL/UL signals in the unlicensed band. Each transmission/reception section 203 may be able to transmit/receive DL/UL signals in the licensed band.

The baseband signal processing section 204 performs reception processing such as FFT processing, error correction decoding and retransmission control and the like on the received baseband signals. Downlink user data is transferred to the application section 205. The application section 205 performs processing related to higher layers above the physical layer and the MAC layer. In the downlink data, broadcast information is also transferred to the application section 205.

On the other hand, uplink user data is input from the application section 205 to the baseband signal processing section 204. In the baseband signal processing section 204, retransmission control transmission processing (for example, HARQ transmission processing), channel coding, precoding, DFT (Discrete Fourier Transform) processing, IFFT processing and so on are performed, and the resultant signals are transferred to each transmission/reception section 203. In the transmission/reception section 203, the baseband signals output from the baseband signal processing section 204 are converted into a radio frequency band. After that, the radio frequency signals frequency-converted in the transmission/reception section 203 are amplified in the amplifying section 202, and then, transmitted from the transmission/reception antenna 201.

Figure 16:
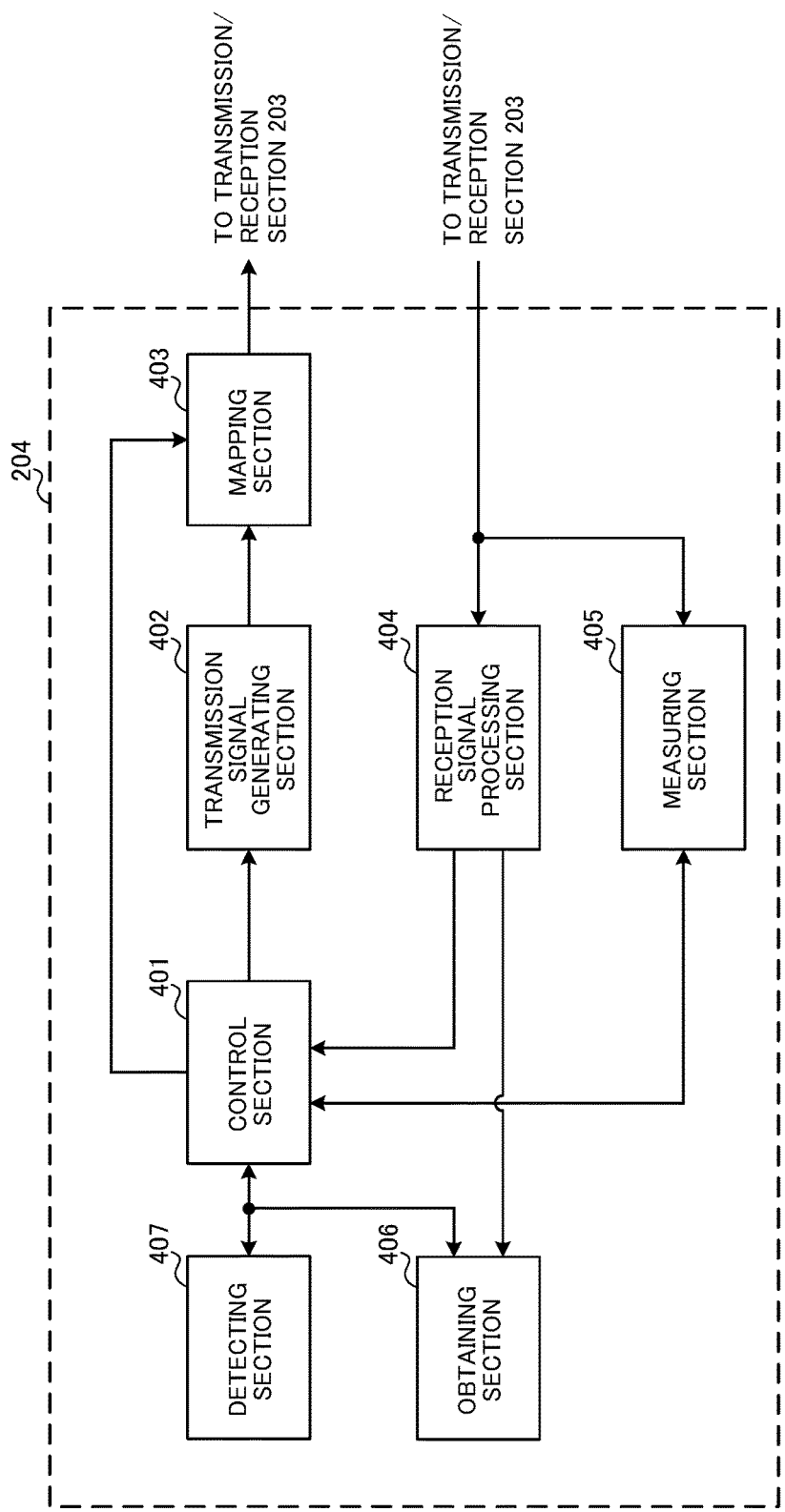
FIG. 16 is a diagram for explaining the functional configuration of the user terminal according to the embodiment of the present invention.

FIG. 16 is a diagram illustrating a functional configuration of the user terminal 20. The functional configuration in FIG. 16 is mainly of featuring parts according to the present embodiment, and the user terminal 20 may also have other functional blocks required for radio communication.

As illustrated in FIG. 16, the baseband signal processing section 204 of the user terminal 20 has a control section 401, a transmission signal generating section 402, a mapping section 403, a reception signal processing section 404, a measuring section 405, an obtaining section 406 and a detecting section 407.

The control section 401 obtains, from the reception signal processing section 404, downlink control signals (signals transmitted in PDCCH/EPDCCH) transmitted from the radio base station 10 and downlink data signals (signals transmitted in PDSCH) transmitted from the radio base station 10. The control section 401 controls generation of an uplink control signal (for example, a transmission acknowledgement signal (HARQ-ACK) and so on) and an uplink data signal based on a downlink control signal and a result of determination whether retransmission control is required for a downlink data signal or not. Specifically, the control section 401 performs controls of the transmission signal generating section 402 and the mapping section 403. The control section 401 may be configured of a controller, a control circuit or a control device explained based on common knowledge in the technical field to which the present invention pertains.

In addition, when receiving, from the reception signal processing section 404, configuration of Proximity indication (Measurement configuration) transmitted from the radio base station 10, the control section 401 controls the obtaining section 406 to obtain PLMN-ID found in cell search. Further, the control section 401 provides PLMN-ID of another operator to the detecting section 407.

When receiving, from the detecting section 407, a determination result that the user terminal 20 is in proximity to the cell of another operator, the control section 401 controls the transmission signal generating section 402 and the mapping section 403 to transmit the information about the proximity state to the cell (Proximity indication) to the radio base station 10.

Further, when receiving, from the reception signal processing section 404, configuration for RRM measurement of another operator cell transmitted from the radio base station 10, the control section 401 controls the measuring section 405 to perform the RRM measurement of the cell. When a predetermined condition (for example, Event A7, A8) is met based on the measurement result input from the measuring section 405, the control section 401 controls the transmission signal generating section 402 and the mapping section 403 to transmit an RRM measurement report to the radio base station 10.

The transmission signal generating section 402 generates UL signals (uplink control signals, uplink data signals, uplink reference signals and so on) based on an instruction from the control section 401 and output them to the mapping section 403. For example, the transmission signal generating section 402 generates an uplink control signal such as a transmission acknowledgement signal (HARQ-ACK), channel state information (CSI) and so on based on the instruction from the control section 401. Besides, the transmission signal generating section 402 generates an uplink data signal based on an instruction from the control section 401. For example, when an UL grant is included in a downlink control signal given from the radio base station 10, the control section 401 instructs the transmission signal generating section 402 to generate an uplink data signal. The transmission signal generating section 402 may be configured of a signal generating unit, a signal generating circuit or a signal generator explained based on common knowledge in the technical field to which the present invention pertains.

The mapping section 403 maps uplink signals generated in the transmission signal generating section 402 to radio resources based on an instruction from the control section 401, and outputs them to the transmission/reception sections 203. The mapping section 403 may be configured of a mapper, a mapping circuit or a mapping device explained based on common knowledge to which the present invention pertains.

The reception signal processing section 404 performs reception processing (for example, demapping, demodulation, decoding and so on) on DL signals transmitted in the licensed band and unlicensed band (for example, downlink control signals transmitted from the radio base station and downlink data signals transmitted in PDSCH from the radio base station). The reception signal processing section 404 outputs the information received from the radio base station 10, to the control section 401. The reception signal processing section 404 may be a signal processing unit, a signal processing circuit or a signal processing device explained based on common knowledge in the technical field to which the present invention pertains.

The measuring section 405 measures reception power (RSRP), reception quality (RSRQ), a channel state or the like by using a signal received in the unlicensed band. When receiving information of a measurement signal configuration, timing, etc. of another operator cell provided from the radio base station 10, the measuring section 405 may measure a given radio resource to use by the other operator cell based on this information. A measurement result is output to the control section 401. The measuring section 405 may be configured of a measuring unit, a measuring circuit or a measurement device explained based on common knowledge in the technical field to which the present invention pertains.

The obtaining section 406 obtains PLMN-ID of a discovered cell from a processing result of the reception signal processing device 404 based on an instruction from the control section 401 and outputs it to the detecting section 407.

The detecting section 407 determines whether the PLMN-ID input from the obtaining section 406 corresponds to another operator (operator different from the operator of the radio base station 10 in a connecting state), based on an instruction from the control section 401 and outputs a determination result to the control section 401.

The block diagrams used for explaining the above-mentioned embodiments show blocks provided for the respective functions. These functional blocks (structural parts) are realized by any combination of hardware and software. Further, each functional block may be realized by any method. That is, each functional block may be realized by one physically connected device or a plurality of devices connected wiredly or wirelessly.

For example, a part or all of functions of the radio base station 10 and the user terminal 20 may be realized by using hardware such as ASIC (Application Specific Integrated Circuit), PLD (Programmable Logic Device), FPGA (Field Programmable Gate Array). In addition, the radio base station 10 and the user terminal 20 may be realized by any computer device including a processor (CPU), a communication interface for network connection, a memory, and a program-stored computer readable storage medium.

Here, the processor, the memory and other devices are connected by bus. Besides, the computer readable storage medium is, for example, a flexible disk, a magnetic optical disk, a ROM, an EPROM, a CD-ROM, a RAM, a hard disk, or any other storing medium. Further, the program may be transmitted from the network via the electric communication line. Furthermore, the radio base station 10 and the user terminal 20 may include an input device such as an input key and an output device such as a display.

The functional configurations of the radio base station 10 and the user terminal 20 may be realized by the above-mentioned hardware or by software module executed by the processor or by using the hardware and software module in combination. The processor controls the user terminal entirely by operating the operating system. The processor reads out a program, software module and data from the storage medium into the memory and executes various processes in accordance with them. This program may be a program to execute each operation explained in each embodiment mentioned above by the computer. For example, the control section 401 of the user terminal 20 may be stored in the memory to be executed by a control program controlled by a processor or the other functional blocks may be also executed in the same manner.

Now, although the present invention has been described in detail with reference to the above embodiment, it should be obvious to a person skilled in the art that the present invention is by no means limited to the embodiments described herein. For example, the above-described embodiments may be implemented alone or in combination. The present invention can be implemented with various corrections and in various modifications, without departing from the spirit and scope of the present invention defined by the recitations of the claims. Consequently, the descriptions herein are provided for the illustrative purpose only, and should by no means be construed to limit the present invention in any way.

The disclosure of Japanese Patent Application No. 2014-195458 filed on Sep. 25, 2014, including the specification, drawings, and abstract, is incorporated herein by reference in its entirety.

The invention claimed is:

1. A user terminal capable of communicating with a radio base station of a given operator using an unlicensed band, the user terminal comprising:
   an obtaining section that obtains a PLMN-ID (Public Land Mobile Network Identifier) of a cell that is detected in a cell search;
   a detecting section that detects the cell of an other operator cell that is different from the given operator based on the PLMN-ID;
   a transmission section that transmits an identifier to specify the cell of the other operator and the PLMN-ID of the other operator to the radio base station; and
   a measuring section that measures RSRP (Reference Signal Received Power) and/or RSRQ (Reference Signal Received Quality) of the cell of the other operator based on RRM (Radio Resource Management) measurement configuration provided from the radio base station,
   wherein when the RSRP and/or the RSRQ meets a given condition, the transmission section transmits a measurement report including the RSRP and/or the RSRQ to the radio base station, and
   wherein the measurement report further includes, as the identifier, a PCID (Physical Cell Identifier) or a TPID (Transmission Point Identification) of the cell of the other operator.

2. The user terminal according to claim 1, wherein the detecting section detects the cell of the other operator based on the PLMN-ID and information about the PLMN-ID of the other operator provided from the radio base station.

3. The user terminal according to claim 1, wherein the obtaining section obtains the PLMN-ID based on any of system information, a reference signal and a broadcast signal transmitted in the cell of the other operator.

4. The user terminal according to claim 1, wherein the given condition is that the RSRP and/or the RSRQ of the cell of the other operator is greater than a second threshold.

5. The user terminal according to claim 1, wherein the given condition is that RSRP and/or RSRQ of a cell of the given operator is smaller than a first threshold and the RSRP and/or the RSRQ of the cell of the other operator is greater than a second threshold.

6. The user terminal according to claim 1, further comprising:
   a reception section that receives data transmitted on PDSCH (Physical Downlink Shared Channel) from the radio base station,
   wherein the measuring section measures a CQI (Channel Quality Indicator) of a cell of the given operator,
   the transmission section transmits the CQI to the radio base station, and transmission of the data is controlled to be stopped or resumed based on any of the RSRP and/or the RSRQ, the CQI and an LBT (Listen Before Talk) result in the radio base station or a combination thereof.

7. The user terminal according to claim 2, wherein the obtaining section obtains the PLMN-ID based on any of system information, a reference signal and a broadcast signal transmitted in the cell of the other operator.

8. A radio base station of a given operator communicating with a user terminal capable of using an unlicensed band, the radio base station comprising:
   a transmission section that transmits, to the user terminal, information about a PLMN-ID (Public Land Mobile Network Identifier) of an other operator that is different from the given operator; and
   a reception section that receives information about a cell of the other operator detected by the user terminal based on the information about the PLMN-ID,
   wherein when the reception section receives the information about the cell of the other operator, the transmission section transmits RRM (Radio Resource Management) measurement configuration of the cell to the user terminal,
   wherein the RRM measurement configuration is used to measure RSRP (Reference Signal Received Power) and/or RSRQ (Reference Signal Received Quality) of the cell of the other operator by the user terminal, and
   wherein when the RSRP and/or the RSRQ measured by the user terminal meets a given condition, the reception section receives, from the user terminal, a measurement report including the RSRP and/or the RSRQ and a PCID (Physical Cell Identifier) or a TPID (Transmission Point Identification) of the cell of the other operator.

9. A radio communication method for a user terminal capable of communicating with a radio base station of a given operator using an unlicensed band, the radio communication method comprising:
   obtaining a PLMN-ID (Public Land Mobile Network Identifier) of a cell that is detected in a cell search;
   detecting the cell of an other operator cell that is different from the given operator based on the PLMN-ID;
   transmitting an identifier to specify the cell of the other operator and the PLMN-ID of the other operator to the radio base station; and
   measuring RSRP (Reference Signal Received Power) and/or RSRQ (Reference Signal Received Quality) of the cell of the other operator based on RRM (Radio Resource Management) measurement configuration provided from the radio base station,
   wherein when the RSRP and/or the RSRQ meets a given condition, the user terminal transmits a measurement report including the RSRP and/or the RSRQ to the radio base station, and
   wherein the measurement report further includes, as the identifier, a PCID (Physical Cell Identifier) or a TPID (Transmission Point Identification) of the cell of the other operator.

* * * * *